United States Patent
Weng et al.

(10) Patent No.: US 12,117,671 B2
(45) Date of Patent: Oct. 15, 2024

(54) CAMERA LENS GROUP

(71) Applicant: ZHEJIANG SUNNY OPTICS CO., LTD., Yuyao (CN)

(72) Inventors: Xiaofeng Weng, Yuyao (CN); Jianke Wenren, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 410 days.

(21) Appl. No.: 17/509,597

(22) Filed: Oct. 25, 2021

(65) Prior Publication Data
US 2022/0043238 A1    Feb. 10, 2022

(30) Foreign Application Priority Data
Dec. 15, 2020   (CN) .......................... 202011475022.5

(51) Int. Cl.
*G02B 9/64*   (2006.01)
*G02B 13/00*   (2006.01)

(52) U.S. Cl.
CPC ........... *G02B 9/64* (2013.01); *G02B 13/0045* (2013.01)

(58) Field of Classification Search
CPC ............................. G02B 9/64; G02B 13/0045
USPC ........................................................ 359/708
See application file for complete search history.

(56) References Cited

U.S. PATENT DOCUMENTS

| | | | |
|---|---|---|---|
| 2017/0357081 A1* | 12/2017 | Dai ........................ | G02B 9/64 |
| 2019/0004285 A1 | 1/2019 | Tang et al. | |
| 2019/0121100 A1* | 4/2019 | Song ...................... | G02B 13/00 |
| 2019/0121102 A1* | 4/2019 | Zhang ................ | G02B 13/0045 |
| 2019/0170966 A1* | 6/2019 | Wenren ................... | G02B 9/64 |

FOREIGN PATENT DOCUMENTS

| | | |
|---|---|---|
| CN | 109828361 A | 5/2019 |
| CN | 110082888 A | 8/2019 |
| CN | 110618522 A | 12/2019 |
| CN | 110703418 A | 1/2020 |
| CN | 213715587 U | 7/2021 |
| WO | 2020/168705 A1 | 8/2020 |

OTHER PUBLICATIONS

First Examination Report dated Jul. 12, 2022 from the Intellectual Property Office of India in IN Application No. 202114048429.

* cited by examiner

*Primary Examiner* — William R Alexander
*Assistant Examiner* — Sharrief I Broome
(74) *Attorney, Agent, or Firm* — Sughrue Mion, PLLC

(57) ABSTRACT

A camera lens group, along an optical axis from an object side to an image side, sequentially includes a first lens to a seventh lens. The first lens has positive refractive power; the second lens has refractive power; the third lens has refractive power; the fourth lens has refractive power, a convex object-side surface, and a convex image-side surface; the fifth lens has refractive power, a convex object-side surface, and a concave image-side surface; the sixth lens has refractive power, and a concave image-side surface; and the seventh lens has refractive power. A total effective focal length f of the camera lens group and an entrance pupil diameter EPD of the camera lens group satisfy: f/EPD<1.45.

20 Claims, 9 Drawing Sheets

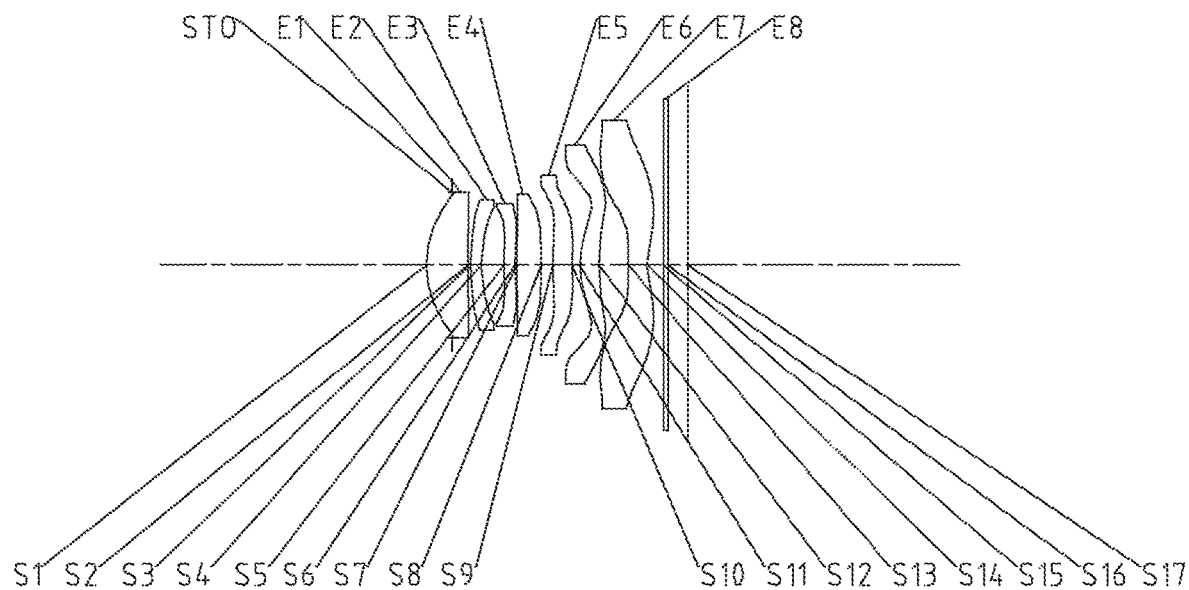
Fig. 1
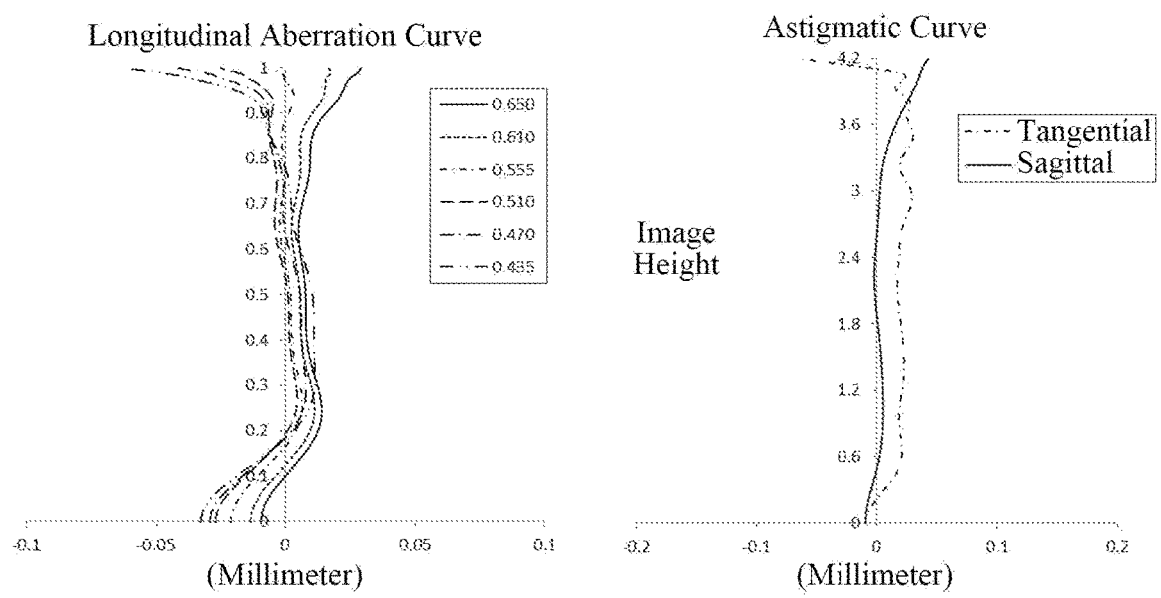
Fig. 2A
Fig. 2B

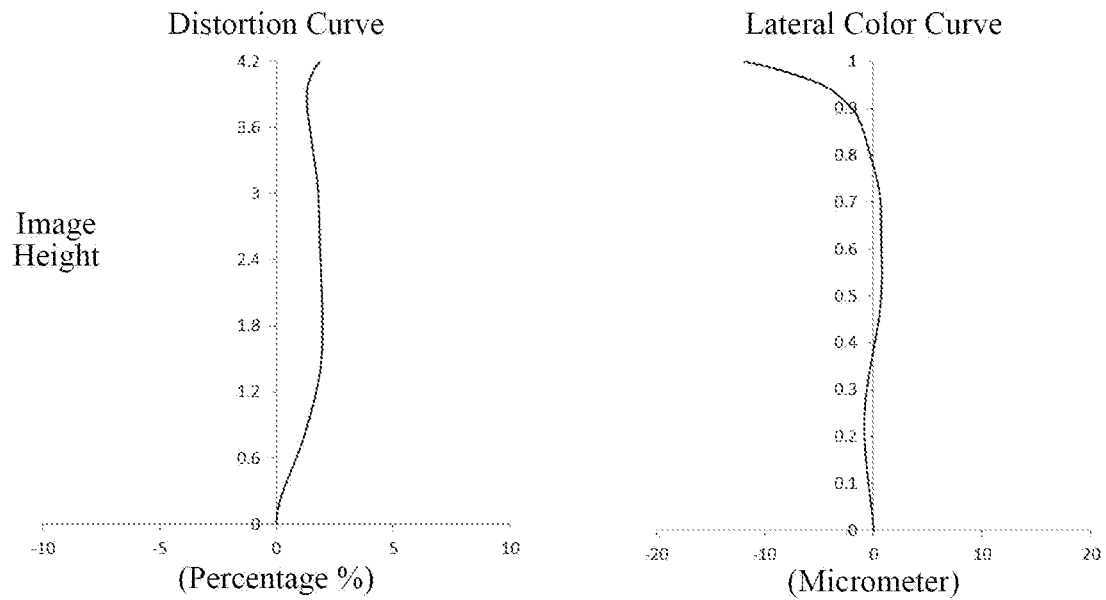
Fig. 2C
Fig. 2D
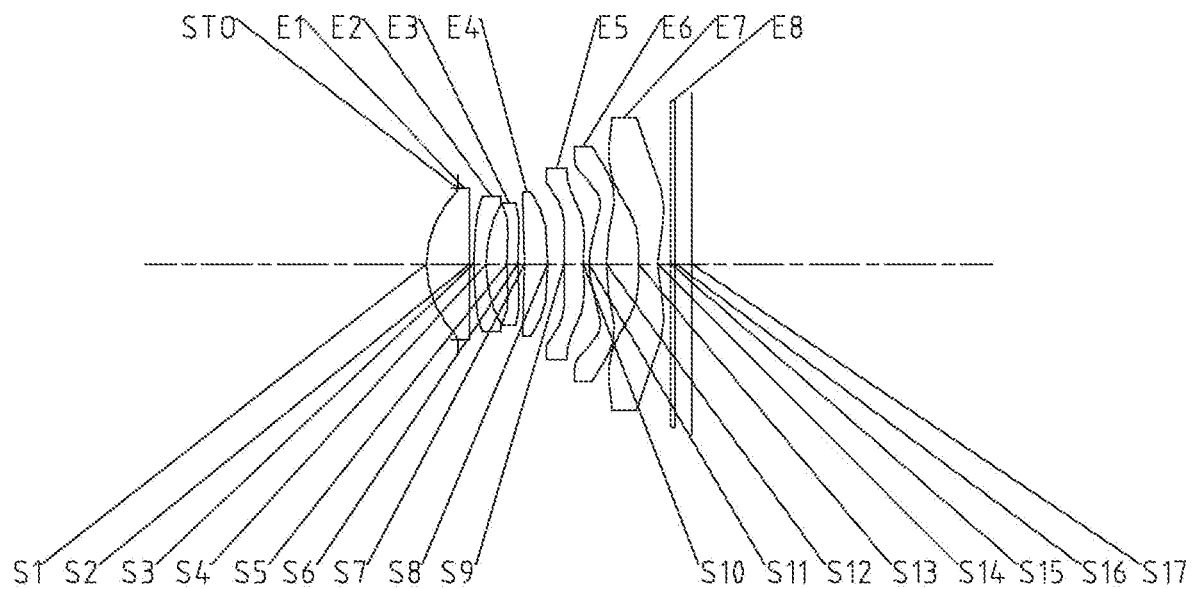
Fig. 3

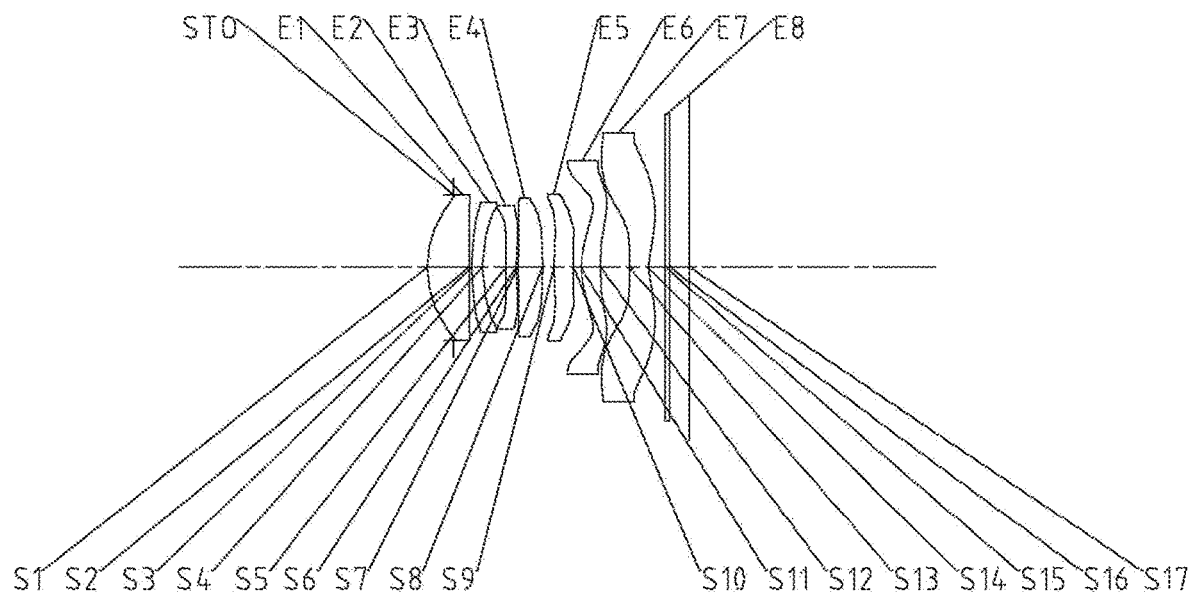
Fig. 5
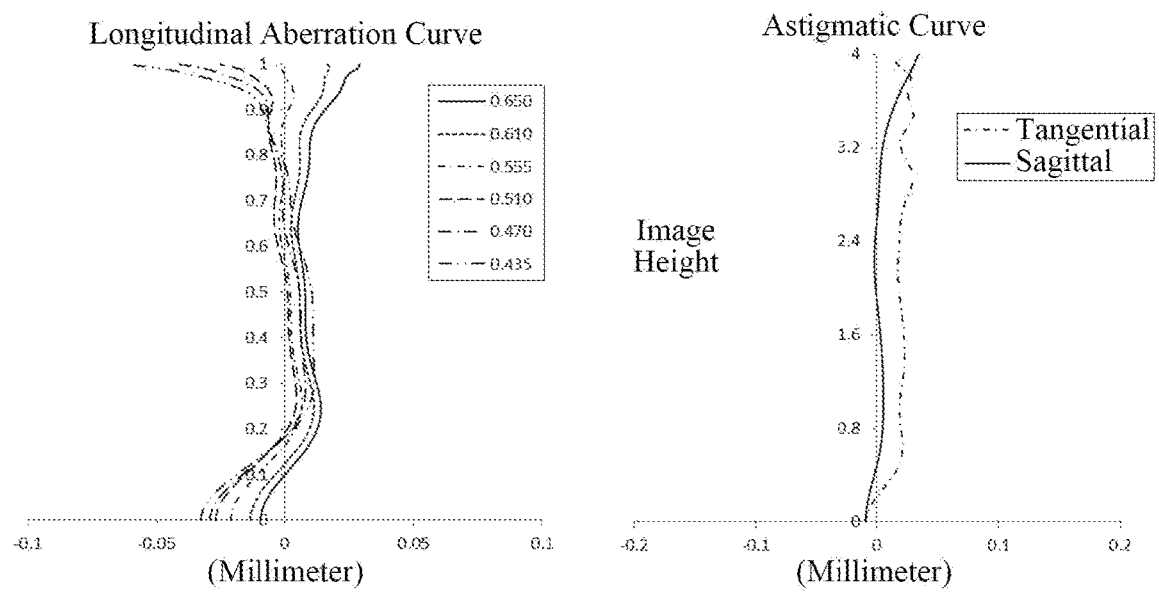
Fig. 6A                    Fig. 6B

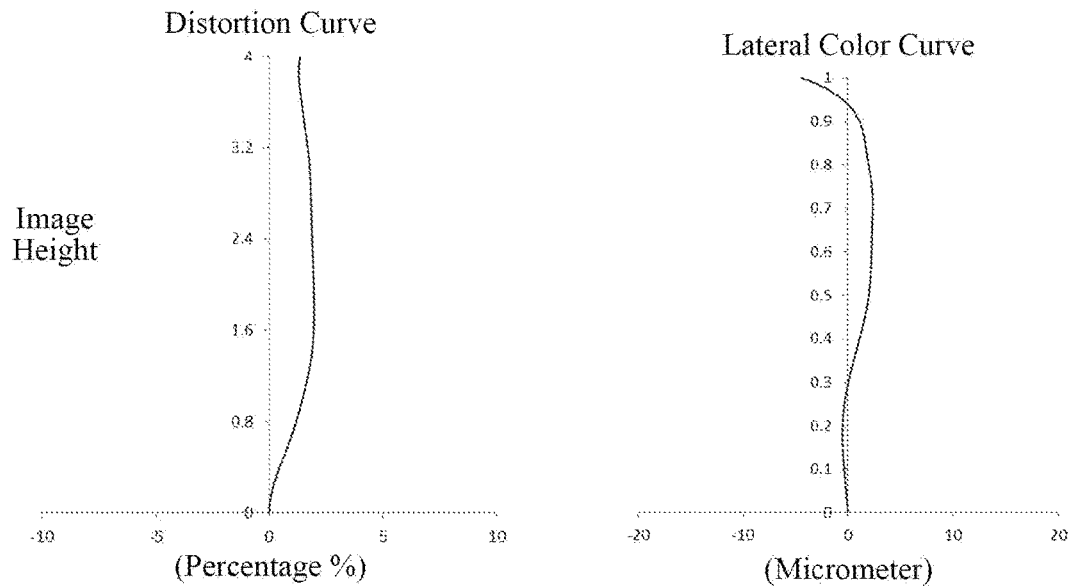
Fig. 6C
Fig. 6D
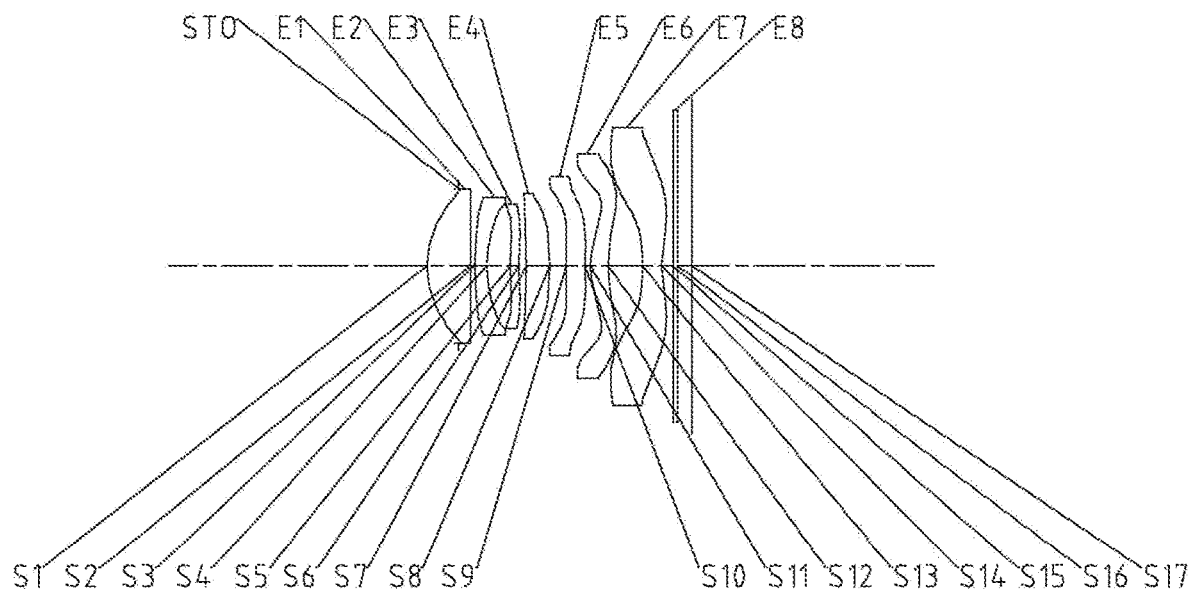
Fig. 7

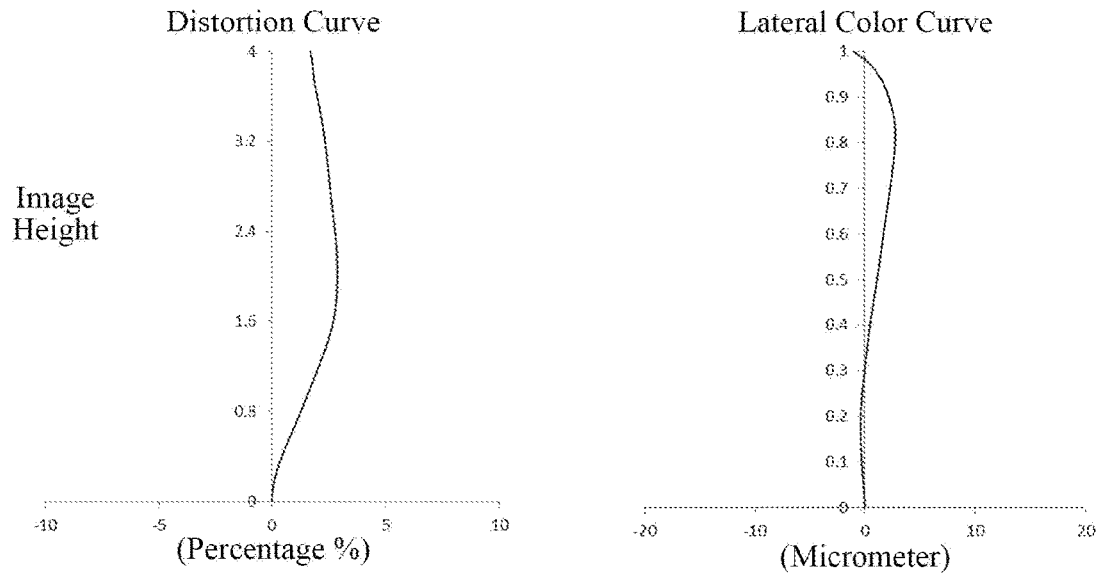
Fig. 10C
Fig. 10D
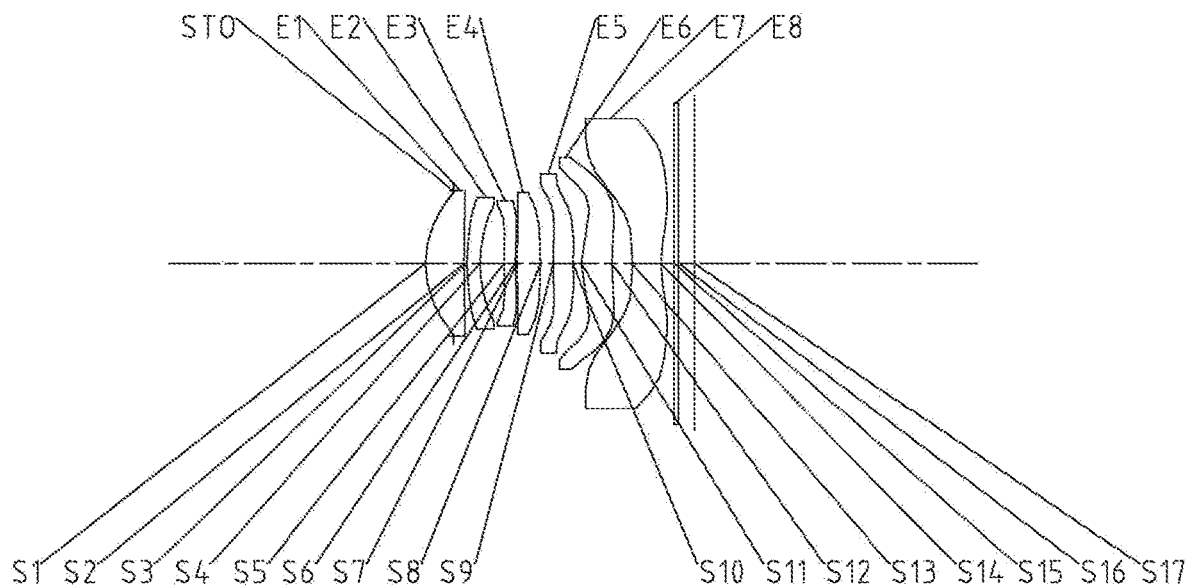
Fig. 11

CAMERA LENS GROUP

CROSS-REFERENCE TO RELATED APPLICATIONS

This application claims benefit of priority to Chinese Patent Application No. 202011475022.5 filed on Dec. 15, 2020 before the China National Intellectual Property Administration, the entire disclosure of which is incorporated herein by reference in its entity.

TECHNICAL FIELD

Embodiments of the present disclosure relate to the field of optical elements, and in particular, to a camera lens group.

BACKGROUND

In recent years, with the rapid upgrading of portable smart electronic devices such as mobile phones, computers and tablets, the market has put forward higher requirements for the imaging quality of camera lens groups used in portable smart electronic devices.

The current camera lens group is becoming more and more miniaturized, however, how to ensure that the camera lens group not only has the characteristics of miniaturization, but also has enough luminous flux to ensure that the imaging plane of the camera lens group has high illuminance, to achieve a clear imaging effect in a relatively low-light environment is one of the problems that many lens assembly designers need to solve urgently.

SUMMARY

In one aspect, some embodiments of the present disclosure provide a camera lens group. The camera lens group, along an optical axis from an object side to an image side, sequentially includes: a first lens having positive refractive power; a second lens having refractive power; a third lens having refractive power; a fourth lens having refractive power, an object-side surface of the fourth lens being a convex surface, and an image-side surface of the fourth lens being a convex surface; a fifth lens having refractive power, an object-side surface of the fifth lens being a convex surface, and an image-side surface of the fifth lens being a concave surface; a sixth lens having refractive power, and an image-side surface of the sixth lens being a concave surface; and a seventh lens having refractive power. A total effective focal length f of the camera lens group and an entrance pupil diameter EPD of the camera lens group may satisfy: f/EPD<1.45.

In one embodiment, at least one of the surfaces from an object-side surface of the first lens to an image-side surface of the seventh lens is an aspheric surface.

In one embodiment, the total effective focal length f of the camera lens group and an effective focal length f1 of the first lens may satisfy: 0.5<f1/f<1.5.

In one embodiment, a maximum effective radius DT11 of an object-side surface of the first lens and a maximum effective radius DT31 of an object-side surface of the third lens may satisfy: 0.6<DT31/DT11<1.

In one embodiment, a spacing distance T12 between the first lens and the second lens on the optical axis and a spacing distance T34 between the third lens and the fourth lens on the optical axis may satisfy: 0.6<T34/T12<2.

In one embodiment, a center thickness CT1 of the first lens on the optical axis, a center thickness CT2 of the second lens on the optical axis, and a center thickness CT3 of the third lens on the optical axis may satisfy: 1.3<CT1/(CT2+CT3)<2.1.

In one embodiment, a radius of curvature R7 of the object-side surface of the fourth lens and a radius of curvature R8 of the image-side surface of the fourth lens may satisfy: −9<R7/R8<0.

In one embodiment, a radius of curvature R9 of the object-side surface of the fifth lens and a radius of curvature R10 of the image-side surface of the fifth lens may satisfy: 0.2<R10/R9<0.8.

In one embodiment, an effective focal length f6 of the sixth lens and a radius of curvature R12 of the image-side surface of the sixth lens may satisfy: 0.2<f6/R12<0.9.

In one embodiment, a center thickness CT7 of the seventh lens on the optical axis and an edge thickness ET7 of the seventh lens may satisfy: 1<ET7/CT7<1.8.

In one embodiment, an axial distance SAG31 from an intersection of an object-side surface of the third lens and the optical axis to a vertex of an effective radius of the object-side surface of the third lens, and an axial distance SAG32 from an intersection of an image-side surface of the third lens and the optical axis to a vertex of an effective radius of the image-side surface of the third lens, may satisfy: 0.1<SAG32/SAG31<0.5.

In one embodiment, a distance TTL from the object-side surface of the first lens to an imaging plane of the camera lens group on the optical axis and half of a diagonal length ImgH of an effective pixel area on the imaging plane of the camera lens group may satisfy: TTL/ImgH≤1.59.

In another aspect, some embodiments of the present disclosure provide a camera lens group. The camera lens group, along an optical axis from an object side to an image side, sequentially includes: a first lens having positive refractive power: a second lens having refractive power; a third lens having refractive power; a fourth lens having refractive power, an object-side surface of the fourth lens being a convex surface, and an image-side surface of the fourth lens being a convex surface; a fifth lens having refractive power, an object-side surface of the fifth lens being a convex surface, and an image-side surface of the fifth lens being a concave surface; a sixth lens having refractive power, and an image-side surface of the sixth lens being a concave surface; and a seventh lens having refractive power. An effective focal length f6 of the sixth lens and a radius of curvature R12 of the image-side surface of the sixth lens may satisfy: 0.2<|f6/R12|<0.9.

In one embodiment, a total effective focal length f of the camera lens group and an effective focal length f1 of the first lens may satisfy: 0.5<f1/f<1.5.

In one embodiment, a maximum effective radius DTI 1 of an object-side surface of the first lens and a maximum effective radius DT31 of an object-side surface of the third lens may satisfy: 0.6<DT31/DT11<1.

In one embodiment, a spacing distance T12 between the first lens and the second lens on the optical axis and a spacing distance T34 between the third lens and the fourth lens on the optical axis may satisfy: 0.6<T34/T12<2.

In one embodiment, a center thickness CT1 of the first lens on the optical axis, a center thickness CT2 of the second lens on the optical axis, and a center thickness CT3 of the third lens on the optical axis may satisfy: 1.3<CT1/(CT2+CT3)<2.1.

In one embodiment, a radius of curvature R7 of the object-side surface of the fourth lens and a radius of curvature R8 of the image-side surface of the fourth lens may satisfy: −9<R7/R8<0.

In one embodiment, a radius of curvature R9 of the object-side surface of the fifth lens and a radius of curvature R10 of the image-side surface of the fifth lens may satisfy: $0.2<R10/R9<0.8$.

In one embodiment, a center thickness CT7 of the seventh lens on the optical axis and an edge thickness ET7 of the seventh lens may satisfy: $1<ET7/CT7<1.8$.

In one embodiment, an axial distance SAG31 from an intersection of an object-side surface of the third lens and the optical axis to a vertex of an effective radius of the object-side surface of the third lens, and an axial distance SAG32 from an intersection of an image-side surface of the third lens and the optical axis to a vertex of an effective radius of the image-side surface of the third lens, may satisfy: $0.1<SAG32/SAG31<0.5$.

In one embodiment, a distance TTL from the object-side surface of the first lens to an imaging plane of the camera lens group on the optical axis and half of a diagonal length ImgH of an effective pixel area on the imaging plane of the camera lens group may satisfy: $TTL/ImgH \leq 1.59$.

In one embodiment, the total effective focal length f of the camera lens group and an entrance pupil diameter EPD of the camera lens group may satisfy: $f/EPD<1.45$.

By properly distributing the refractive powers and optimizing the optical parameters, embodiments of the present disclosure provide a camera lens group having a large aperture, miniaturization and good imaging quality and is suitable for portable electronic products.

BRIEF DESCRIPTION OF THE DRAWINGS

By reading detailed description of non-limiting embodiments with reference to the following accompanying drawings, other features, objectives and advantages of the present disclosure will be more apparent:

FIG. 1 is a schematic structural diagram illustrating a camera lens group according to Embodiment 1 of the present disclosure;

FIGS. 2A-2D respectively illustrate a longitudinal aberration curve, an astigmatic curve, a distortion curve and a lateral color curve of the camera lens group according to Embodiment 1;

FIG. 3 is a schematic structural diagram illustrating a camera lens group according to Embodiment 2 of the present disclosure:

FIG. 5 is a schematic structural diagram illustrating a camera lens group according to Embodiment 3 of the present disclosure;

FIGS. 6A-6D respectively illustrate a longitudinal aberration curve, an astigmatic curve, a distortion curve and a lateral color curve of the camera lens group according to Embodiment 3:

FIG. 7 is a schematic structural diagram illustrating a camera lens group according to Embodiment 4 of the present disclosure;

FIGS. 10A-10D respectively illustrate a longitudinal aberration curve, an astigmatic curve, a distortion curve and a lateral color curve of the camera lens group according to Embodiment 5:

FIG. 11 is a schematic structural diagram illustrating a camera lens group according to Embodiment 6 of the present disclosure.

DETAILED DESCRIPTION OF EMBODIMENTS

Figure 4A:
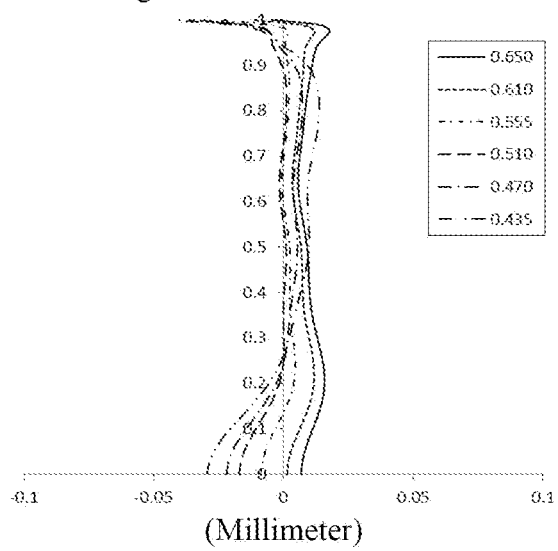
FIGS. 4A-4D respectively illustrate a longitudinal aberration curve, an astigmatic curve, a distortion curve and a lateral color curve of the camera lens group according to Embodiment 2.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Particularly, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that embodiments in the present disclosure and the features in embodiments may be combined with each other on a non-conflict basis. Embodiments of the present disclosure will be described below in detail with reference to the accompanying drawings.

The features, principles, and other aspects of the present disclosure are described in detail below.

The camera lens group according to exemplary implementations of the present disclosure may include seven lenses having refractive powers, that is, a first lens, a second lens, a third lens, a fourth lens, a fifth lens, a sixth lens and a seventh lens respectively. The seven lenses are sequentially arranged from the object side to the image side along the optical axis. Any two adjacent lenses in the first lens to the seventh lens may have a spacing distance in between.

In an exemplary implementation, the first lens may have positive refractive power; the second lens may have positive refractive power or negative refractive power; the third lens may have positive refractive power or negative refractive power; the fourth lens may have positive refractive power or negative refractive power, an object-side surface of the fourth lens may be a convex surface, and an image-side surface of the fourth lens may be a convex surface; the fifth lens may have positive refractive power or negative refractive power, an object-side surface of the fifth lens may be a convex surface, and an image-side surface of the fifth lens may be a concave surface; the sixth lens may have positive refractive power or negative refractive power, and an image-side surface of the sixth lens may be a concave surface; and the seventh lens may have positive refractive power or negative refractive power.

In an exemplary implementation, the camera lens group may satisfy: f/EPD<1.45, where f is a total effective focal length of the camera lens group, and EPD is an entrance pupil diameter of the camera lens group. More particularly, f and EPD may further satisfy: f/EPD<1.40. Satisfying f/EPD<1.45, may cause the F number of the camera lens group to be less than 1.45, realize the advantage of a large aperture for the camera lens group, which is conducive to make the camera lens group capture a larger amount of light, and ensure that there is good imaging illuminance during shooting, so that the camera lens group may also have a good imaging effect when shooting in a dark scene. If the value of f/EPD is too large, it may cause problems such as weak imaging light energy and decreased recognition accuracy during shooting.

In an exemplary implementation, the camera lens group may satisfy: 0.5<f1/f<1.5, where f is the total effective focal length of the camera lens group, and f1 is an effective focal length of the first lens. More particularly, f and f1 may further satisfy: 0.9<f1/f<1.2. Satisfying 0.5<f1/f<1.5, the deflection angle of light may be controlled within a certain range, which is beneficial to reduce the sensitivity of the camera lens group, improve imaging quality, and may also effectively balance a spherical aberration, chromatic aberration and astigmatism generated by the first lens.

In an exemplary implementation, the camera lens group may satisfy: 0.6<DT31/DT11<1, where D11 is a maximum effective radius of an object-side surface of the first lens, and D31 is a maximum effective radius of an object-side surface of the third lens. Satisfying 0.6<DT31/DT11<1 may effectively avoid that the diameter difference between the first lens and the third lens is too large, to ensure the assembly stability, and may reasonably limit the range of incident light and eliminate light with poor edge quality at periphery, reduce an off-axis aberration, effectively improve the resolution of the lens group.

In an exemplary implementation, the camera lens group may satisfy: 0.6<T34/T12<2, where T12 is a spacing distance between the first lens and the second lens on the optical axis, and T34 is a spacing distance between the third lens and the fourth lens on the optical axis. Satisfying 0.6<T34/T12<2, a space ratio of the first lens to the fourth lens may be controlled reasonably, which is beneficial to ensure the assembly process of the lenses, and is beneficial to realize miniaturization of the lens group.

In an exemplary implementation, the camera lens group may satisfy: 1.3<CT1/(CT2+CT3)<2.1, where CT1 is a center thickness of the first lens on the optical axis, CT2 is a center thickness of the second lens on the optical axis, and CT3 is a center thickness of the third lens on the optical axis. More particularly, CT1, CT2, and CT3 may further satisfy: 1.5<CT1/(CT2+CT3)<2.0. Satisfying 1.3<CT1/(CT2+CT3) <2.1 may effectively reduce the total length of the lens group, ensure the lightness of a front end of the lens assembly, and reduce processing sensitivity of the lens group.

In an exemplary implementation, the camera lens group may satisfy: −9<R7/R8<0, where R7 is a radius of curvature of the object-side surface of the fourth lens and R8 is a radius of curvature of the image-side surface of the fourth lens. Satisfying −9<R7/R8<0, the curvature of the fourth lens may be controlled, and the optical sensitivity of the fourth lens may be reduced, thereby ensuring good processing performance.

In an exemplary implementation, the camera lens group may satisfy: 0.2<R10/R9<0.8, where R9 is a radius of curvature of the object-side surface of the fifth lens and R10 is a radius of curvature of the image-side surface of the fifth lens. More particularly. R10 and R9 may further satisfy: 0.2<R10/R9<0.7. Satisfying 0.2<R10/R9<0.8, the curvature of the fifth lens may be controlled, so as to ensure good processing performance, and it is beneficial to make the CRA of the chip better match when the light from each field of view of the lens group reaches the imaging plane.

In an exemplary implementation, the camera lens group may satisfy: 0.2<|f6/R12|<0.9, where f6 is an effective focal length of the sixth lens and R12 is a radius of curvature of the image-side surface of the sixth lens. More particularly, f6 and R12 may further satisfy: 0.2<|f6/R12|<0.8. Satisfying 0.2<|f6/R12|<0.9, the curvature of the sixth lens may be controlled, and the contribution of field curvature of the sixth lens may be controlled in a reasonable range, so as to reduce the optical sensitivity of the sixth lens and make the sixth lens obtain better manufacturability.

In an exemplary implementation, the camera lens group may satisfy: 1<ET7/CT7<1.8, where CT7 is a center thickness of the seventh lens on the optical axis and ET7 is an edge thickness of the seventh lens. Satisfying 1<ET7/

CT7<1.8 is beneficial to ensure the processing, molding and assembly features of the seventh lens in order to obtain good imaging quality.

In an exemplary implementation, the camera lens group may satisfy: 0.1<SAG32/SAG31<0.5, where SAG31 is an axial distance from an intersection of an object-side surface of the third lens and the optical axis to a vertex of an effective radius of the object-side surface of the third lens, and SAG32 is an axial distance from an intersection of an image-side surface of the third lens and the optical axis to a vertex of an effective radius of the image-side surface of the third lens. More particularly. SAG32 and SAG31 may further satisfy: 0.2<SAG32/SAG31<0.5. Satisfying 0.1<SAG32/SAG31<0.5 is conducive to balancing the field curvature, on-axis spherical aberration and chromatic spherical aberration of the camera lens group, thereby enabling the camera lens group to obtain good imaging quality and lower system sensitivity, thus better ensuring the processability of the lens group.

In an exemplary implementation, the camera lens group may satisfy: TTL/ImgH≤1.59, where TTL is a distance from the object-side surface of the first lens to an imaging plane of the camera lens group on the optical axis, and ImgH is half of a diagonal length of an effective pixel area of the camera lens group. Satisfying TTL/ImgH≤1.59 is conducive to making the lens group smaller in size to achieve miniaturization, and at the same time, ensuring that the lens group has a imaging plan large enough e to present more detailed information of the subject.

In an exemplary implementation, the camera lens group may further include a diaphragm arranged between the object side and the first lens. Alternatively, the above camera lens group may further include an optical filter for correcting the color deviation and/or a cover glass for protecting the photosensitive element located on the imaging plane. Embodiments of the present disclosure propose a camera lens group having the characteristics of miniaturization, high relative illumination, large aperture, ultra-thin and high imaging quality. The camera lens group according to the above implementations of the present disclosure may use a plurality of lenses, for example, seven lenses as described in the preceding text. By properly distributing the refractive power of each lens, the surface type, the center thickness of each lens and the axial distance between the lenses, etc., it may effectively converge incident light, reduce the total track length of the imaging lens assembly and improve the processability of the imaging lens assembly, making the camera lens group more conducive to production and processing.

In the implementations of the present disclosure, at least one of the surfaces of the lenses is an aspheric surface, that is, at least one of the surfaces from the object-side surface of the first lens to the image-side surface of the seventh lens is an aspheric surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, having advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens and the seventh lens is an aspheric surface. Alternatively, the object-side surface and the image-side surface of each of the first lens, the second lens, the third lens, the fourth lens, the fifth lens, the sixth lens and the seventh lens are both aspheric surfaces.

However, it should be understood by those skilled in the art that the various results and advantages described in the present specification may be obtained by changing the number of the lenses constituting the camera lens group without departing from the technical solution claimed by the present disclosure. For example, although the camera lens group having seven lenses is described as an example in the implementations, the camera lens group is not limited to include seven lenses. If desired, the camera lens group may also include other numbers of lenses.

Embodiments of the camera lens group that may be applied to the above implementations are further described below with reference to the accompanying drawings.

Embodiment 1

A camera lens group according to Embodiment 1 of the present disclosure is described below with reference to FIGS. 1-2D. FIG. 1 is a schematic structural diagram illustrating the camera lens group according to Embodiment 1 of the present disclosure.

As shown in FIG. 1, the camera lens group from an object side to an image side sequentially includes a diaphragm STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the respective surfaces S1 to S16 and finally forms an image on the imaging plane S17.

Table 1 is a table illustrating basic parameters of the camera lens group of Embodiment 1, where the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6095 | | | | |
| S1 | Aspheric | 2.4602 | 0.9847 | 1.55 | 56.11 | 5.43 | −0.0479 |
| S2 | Aspheric | 12.4182 | 0.0565 | | | | 6.1769 |
| S3 | Aspheric | 3.8343 | 0.2550 | 1.68 | 19.25 | −16.08 | 2.4930 |
| S4 | Aspheric | 2.7601 | 0.5472 | | | | 0.5728 |
| S5 | Aspheric | 10.4414 | 0.2550 | 1.68 | 19.25 | −18.28 | −4.4423 |
| S6 | Aspheric | 5.6102 | 0.0488 | | | | −0.9652 |
| S7 | Aspheric | 10.9591 | 0.5747 | 1.55 | 56.11 | 19.70 | −1.6870 |
| S8 | Aspheric | −570.1747 | 0.2733 | | | | 99.0000 |
| S9 | Aspheric | 6.1878 | 0.4540 | 1.57 | 37.31 | −17.19 | 2.0101 |
| S10 | Aspheric | 3.6924 | 0.1893 | | | | −8.6443 |
| S11 | Aspheric | 1.6691 | 0.4626 | 1.55 | 56.11 | 3.81 | −0.9246 |
| S12 | Aspheric | 7.6282 | 0.6861 | | | | −3.4968 |
| S13 | Aspheric | 4.5181 | 0.4450 | 1.55 | 56.11 | −4.28 | −4.4629 |
| S14 | Aspheric | 1.4869 | 0.3953 | | | | −0.8596 |
| S15 | Spherical | Infinite | 0.1100 | 1.52 | 64.17 | | |
| S16 | Spherical | Infinite | 0.4623 | | | | |
| S17 | Spherical | Infinite | Infinite | | | | |

In this embodiment, a total effective focal length f of the camera lens group satisfies f=4.76 mm, a total length of the camera lens group TTL (that is, a distance from the object-side surface S1 of the first lens E1 to the imaging plane S17 of the camera lens group on the optical axis) satisfies TTL=6.20 mm, half of a diagonal length ImgH of an effective pixel area on the imaging plane S17 of the camera lens group satisfies ImgH=4.20 mm, half of a maximum field-of-view Semi-FOV of the camera lens group satisfies Semi-FOV=40.70°, and an F number Fno of the camera lens group satisfies Fno=1.38.

In Embodiment 1, the object-side surface and the image-side surface of any one of the first lens E1 to the seventh lens E7 are both aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis: c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Tables 2-1 and 2-2 below shows high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to each aspheric surface S1 to S14 of the camera lens group according to Embodiment 1.

TABLE 2-1

| Surface number | A4 | A6 | A8 | A10 | A12 | A14 | A16 |
|---|---|---|---|---|---|---|---|
| S1 | −2.0471E−03 | 5.7390E−03 | −9.8340E−03 | 9.2190E−03 | −5.0839E−03 | 1.5124E−03 | −1.8012E−04 |
| S2 | −1.0167E−01 | 2.1113E−01 | −2.9298E−01 | 2.7945E−01 | −1.8257E−01 | 7.9580E−02 | −2.2066E−02 |
| S3 | −1.4546E−01 | 2.2518E−01 | −2.6441E−01 | 1.9165E−01 | −5.0516E−02 | −4.3929E−02 | 5.1312E−02 |
| S4 | −6.6532E−02 | 2.8268E−02 | 1.2063E−01 | −4.1930E−01 | 6.7939E−01 | −6.5789E−01 | 3.9500E−01 |
| S5 | −6.0433E−02 | 3.4264E−02 | −9.1004E−02 | 1.1137E−01 | −5.6285E−02 | −5.2260E−02 | 1.0353E−01 |
| S6 | −7.2925E−02 | 7.8297E−02 | −2.2205E−01 | 4.2436E−01 | −5.4514E−01 | 4.4676E−01 | −2.2402E−01 |
| S7 | −4.7200E−02 | 7.2515E−02 | −2.2827E−01 | 4.7065E−01 | −6.1908E−01 | 5.1401E−01 | −2.5982E−01 |
| S8 | −4.7389E−02 | 9.9312E−03 | 2.0593E−02 | −6.6959E−02 | 6.8284E−03 | 2.0168E−01 | −3.9062E−01 |
| S9 | −1.1744E−01 | 2.0724E−01 | −4.1435E−01 | 6.9258E−01 | −9.0363E−01 | 8.6637E−01 | −5.9878E−01 |
| S10 | −2.7220E−01 | 3.0606E−01 | −3.2966E−01 | 2.9884E−01 | −2.1596E−01 | 1.1932E−01 | −4.9282E−02 |
| S11 | −1.4702E−01 | 1.2231E−01 | −1.0596E−01 | 6.1174E−02 | −2.4792E−02 | 6.7814E−03 | −1.2409E−03 |
| S12 | 4.4107E−02 | −1.2574E−02 | −1.6227E−02 | 1.3459E−02 | −5.3079E−03 | 1.0516E−03 | −3.6627E−06 |
| S13 | −3.0172E−01 | 1.7184E−01 | −7.4359E−02 | 2.3365E−02 | −3.4252E−03 | −4.8657E−04 | 3.5151E−04 |
| S14 | −3.2148E−01 | 2.2015E−01 | −1.2794E−01 | 5.6647E−02 | −1.8512E−02 | 4.4235E−03 | −7.7011E−04 |

TABLE 2-2

| Surface number | A18 | A20 | A22 | A24 | A26 | A28 | A30 |
|---|---|---|---|---|---|---|---|
| S1 | −1.4091E−05 | 3.9261E−06 | 0.0000E+00 | 0.0000E+00 | 0.0000E+00 | 0.0000E+00 | 0.0000E+00 |
| S2 | 3.5137E−03 | −2.4422E−04 | 0.0000E+00 | 0.0000E+00 | 0.0000E+00 | 0.0000E+00 | 0.0000E+00 |
| S3 | −2.3228E−02 | 5.1959E−03 | −4.7146E−04 | 0.0000E+00 | 0.0000E+00 | 0.0000E+00 | 0.0000E+00 |
| S4 | −1.4289E−01 | 2.8161E−02 | −2.2596E−03 | 0.0000E+00 | 0.0000E+00 | 0.0000E+00 | 0.0000E+00 |
| S5 | −6.9673E−02 | 2.2312E−02 | −2.8393E−03 | 0.0000E+00 | 0.0000E+00 | 0.0000E+00 | 0.0000E+00 |
| S6 | 6.4820E−02 | −9.4645E−03 | 4.7631E−04 | 0.0000E+00 | 0.0000E+00 | 0.0000E+00 | 0.0000E+00 |
| S7 | 7.3636E−02 | −8.8482E−03 | −3.7353E−04 | 1.3870E−04 | 0.0000E+00 | 0.0000E+00 | 0.0000E+00 |
| S8 | 3.8831E−01 | −2.3860E−01 | 9.4025E−02 | −2.3219E−02 | 3.2790E−03 | −2.0232E−04 | 0.0000E+00 |
| S9 | 2.9531E−01 | −1.0234E−01 | 2.4209E−02 | −3.6936E−03 | 3.2160E−04 | −1.1014E−05 | −1.5348E−07 |
| S10 | 1.4843E−02 | −3.1097E−03 | 4.1633E−04 | −2.9063E−05 | 1.0978E−06 | 1.1598E−07 | −4.9943E−09 |
| S11 | 1.5759E−04 | −1.4405E−05 | 8.8942E−07 | −2.7044E−08 | 0.0000E+00 | 0.0000E+00 | 0.0000E+00 |
| S12 | −4.9254E−05 | 1.1866E−05 | −1.3599E−06 | 7.9899E−08 | −1.9352E−09 | 0.0000E+00 | 0.0000E+00 |
| S13 | −8.2044E−05 | 1.1172E−05 | −9.6595E−07 | 5.2487E−08 | −1.6432E−09 | 2.2686E−11 | 0.0000E+00 |
| S14 | 9.7075E−05 | −8.7368E−06 | 5.4612E−07 | −2.2494E−08 | 5.4847E−10 | −5.9936E−12 | 0.0000E+00 |

FIG. 2A illustrates the longitudinal aberration curve of the camera lens group according to Embodiment 1, representing deviations of focal points converged by light of different wavelengths after passing through the lens assembly. FIG. 2B illustrates the astigmatic curve of the camera lens group according to Embodiment 1, representing a curvature of a tangential plane and a curvature of a sagittal plane. FIG. 2C illustrates the distortion curve of the camera lens group according to Embodiment 1, representing the amounts of distortion corresponding to different image heights. FIG. 2D illustrates the lateral color curve of the camera lens group according to Embodiment 1, representing deviations of different image heights on the imaging plane after light passes through the lens assembly. It can be seen from FIG. 2A to FIG. 2D that the camera lens group provided in Embodiment 1 can achieve good imaging quality.

Embodiment 2

A camera lens group according to Embodiment 2 of the present disclosure is described below with reference to FIG. 3 to FIG. 4D. In this embodiment and the following embodiments, for the purpose of brevity, the description of parts similar to those in Embodiment 1 will be omitted. FIG. 3 illustrates a schematic structural diagram of the camera lens group according to Embodiment 2 of the present disclosure.

As shown in FIG. 3, the camera lens group from an object side to an image side sequentially includes a diaphragm STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the respective surfaces S1 to S16 and finally forms an image on the imaging plane S17.

In this embodiment, a total effective focal length f of the camera lens group satisfies f=5.04 mm, a total length of the camera lens group TTL satisfies TTL=6.29 mm, half of a diagonal length ImgH of an effective pixel area on the imaging plane S17 of the camera lens group satisfies ImgH=4.00 mm, half of a maximum field-of-view Semi-FOV of the camera lens group satisfies Semi-FOV=37.60°, and an F number Fno of the camera lens group satisfies Fno=1.39.

Table 3 is a table illustrating basic parameters of the camera lens group of Embodiment 2, where the units for the radius of curvature, the thickness/distance and the focal length are millimeter (mm). Tables 4-1 and 4-2 shows high-order coefficients applicable to each aspheric surface according to Embodiment 2, where the surface shape of each aspheric surface may be defined by the formula (1) given in the above Embodiment 1.

TABLE 3

| Surface number | Surface type | Radius of curvature | Thickness/ Distance | Material Refractive index | Abbe number | Focal length | Conic coefficient |
|---|---|---|---|---|---|---|---|
| OBS | Spherical | Infinite | Infinite | | | | |
| STO | Spherical | Infinite | −0.7423 | | | | |
| S1 | Aspheric | 2.3672 | 1.0288 | 1.55 | 56.11 | 5.06 | −0.0153 |
| S2 | Aspheric | 14.0651 | 0.0892 | | | | 14.4944 |
| S3 | Aspheric | 4.2987 | 0.2968 | 1.68 | 19.25 | −10.64 | 2.6081 |
| S4 | Aspheric | 2.6179 | 0.4906 | | | | 0.5530 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S5 | Aspheric | 6.8087 | 0.2600 | 1.68 | 19.25 | 499.31 | 6.7947 |
| S6 | Aspheric | 6.8414 | 0.1615 | | | | 8.4386 |
| S7 | Aspheric | 37.0335 | 0.5518 | 1.55 | 56.11 | 20.40 | 95.0166 |
| S8 | Aspheric | −15.8411 | 0.3911 | | | | 0.4842 |
| S9 | Aspheric | 10.3312 | 0.4500 | 1.57 | 37.31 | −11.59 | 7.2390 |
| S10 | Aspheric | 3.9679 | 0.1357 | | | | −8.1084 |
| S11 | Aspheric | 1.7686 | 0.4114 | 1.55 | 56.11 | 4.44 | −0.9082 |
| S12 | Aspheric | 6.0082 | 0.7597 | | | | −6.6145 |
| S13 | Aspheric | 11.2790 | 0.4528 | 1.55 | 56.11 | −4.19 | −0.0097 |
| S14 | Aspheric | 1.8764 | 0.3153 | | | | −4.0902 |
| S15 | Spherical | Infinite | 0.1100 | 1.52 | 64.17 | | |
| S16 | Spherical | Infinite | 0.3822 | | | | |
| S17 | Spherical | Infinite | Infinite | | | | |

TABLE 4-1

| Surface number | A4 | A6 | A8 | A10 | A12 | A14 | A16 |
|---|---|---|---|---|---|---|---|
| S1 | −7.6883E−04 | 2.1323E−03 | −4.2156E−03 | 4.4408E−03 | −2.9200E−03 | 1.1632E−03 | −2.7647E−04 |
| S2 | −8.2968E−02 | 1.3919E−01 | −1.5812E−01 | 1.2574E−01 | −6.9384E−02 | 2.5732E−02 | −6.0968E−03 |
| S3 | −1.3992E−01 | 1.7785E−01 | −1.6743E−01 | 1.0558E−01 | −3.5078E−02 | −2.5413E−03 | 8.1516E−03 |
| S4 | −8.4569E−02 | 6.3909E−02 | 2.5565E−02 | 4.8495E−01 | 3.0812E−01 | −2.8859E−01 | 1.6550E−01 |
| S5 | −5.2863E−02 | 9.3097E−03 | −3.2320E−02 | 3.9618E−02 | −2.9974E−02 | 3.6192E−04 | 1.9085E−02 |
| S6 | −4.8252E−02 | −1.4668E−02 | 6.8276E−02 | −1.7343E−01 | 2.5855E−01 | −2.4981E−01 | 1.5792E−01 |
| S7 | −2.8612E−02 | −2.1310E−02 | 1.0526E−01 | −2.4556E−01 | 3.6929E−01 | −3.7141E−01 | 2.5156E−01 |
| S8 | 4.7370E−02 | 1.9195E−04 | 3.1695E−02 | −5.7261E−02 | −1.1712E−02 | 1.8848E−01 | −3.3021E−01 |
| S9 | −9.1150E−02 | 1.3786E−01 | −3.1376E−01 | 5.8534E−01 | −8.1487E−01 | 8.0610E−01 | −5.6324E−01 |
| S10 | −2.5001E−01 | 2.6445E−01 | −2.5772E−01 | 2.0789E−01 | 4.3636E−01 | 7.0048E−02 | −2.7265E−02 |
| S11 | −1.4915E−01 | 1.2563E−01 | −1.1098E−01 | 6.7459E−02 | −2.8933E−02 | 8.5453E−03 | −1.7381E−03 |
| S12 | 6.2033E−02 | −4.1806E−02 | 1.9045E−03 | 1.0147E−02 | −7.4366E−03 | 2.8289E−03 | −6.5642E−04 |
| S13 | −2.0994E−01 | 1.0742E−01 | −3.6759E−02 | −8.4465E−05 | 8.7366E−03 | −5.0257E−03 | 1.5487E−03 |
| S14 | −1.6598E−01 | 1.1885E−01 | −6.7604E−02 | 2.8508E−02 | −8.8313E−03 | 2.0105E−03 | −3.3548E−04 |

TABLE 4-2

| Surface number | A18 | A20 | A22 | A24 | A26 | A28 | A30 |
|---|---|---|---|---|---|---|---|
| S1 | 3.4788E−05 | −1.8885E−06 | 0.0000E+00 | 0.0000E+00 | 0.0000E+00 | 0.0000E+00 | 0.0000E+00 |
| S2 | 8.3182E−04 | −4.9702E−05 | 0.0000E+00 | 0.0000E+00 | 0.0000E+00 | 0.0000E+00 | 0.0000E+00 |
| S3 | −3.5654E−03 | 7.1396E−04 | −5.7047E−05 | 0.0000E+00 | 0.0000E+00 | 0.0000E+00 | 0.0000E+00 |
| S4 | −5.6900E−02 | 1.0587E−02 | −7.8862E−04 | 0.0000E+00 | 0.0000E+00 | 0.0000E+00 | 0.0000E+00 |
| S5 | −1.5187E−02 | 5.0952E−03 | −6.5178E−04 | 0.0000E+00 | 0.0000E+00 | 0.0000E+00 | 0.0000E+00 |
| S6 | −6.2565E−02 | 1.4051E−02 | −1.3608E−03 | 0.0000E+00 | 0.0000E+00 | 0.0000E+00 | 0.0000E+00 |
| S7 | −1.1256E−01 | 3.1672E−02 | −5.0427E−03 | 3.4471E−04 | 0.0000E+00 | 0.0000E+00 | 0.0000E+00 |
| S8 | 3.1253E−01 | −1.8542E−01 | 7.0939E−02 | −1.7048E−02 | 2.3455E−03 | −1.4103E−04 | 0.0000E+00 |
| S9 | 2.7771E−01 | −9.5696E−02 | 2.2460E−02 | −3.3989E−03 | 2.9369E−04 | −9.9888E−06 | −1.3822E−07 |
| S10 | 7.7897E−03 | −1.5519E−03 | 1.9623E−04 | −1.2235E−05 | −1.6898E−07 | 7.1439E−08 | −2.9716E−09 |
| S11 | 2.4575E−04 | −2.3601E−05 | 1.3912E−06 | −3.7634E−08 | 0.0000E+00 | 0.0000E+00 | 0.0000E+00 |
| S12 | 9.5441E−05 | −8.3869E−06 | 3.8759E−07 | −4.9132E−09 | −1.6416E−10 | 0.0000E+00 | 0.0000E+00 |
| S13 | −3.0729E−04 | 4.1583E−05 | −3.8968E−06 | 2.4972E−07 | −1.0467E−08 | 2.5896E−10 | −2.8699E−12 |
| S14 | 4.0839E−05 | −3.5978E−06 | 2.2608E−07 | −9.8731E−09 | 2.8548E−10 | −4.9483E−12 | 3.9394E−14 |

Figure 4B:
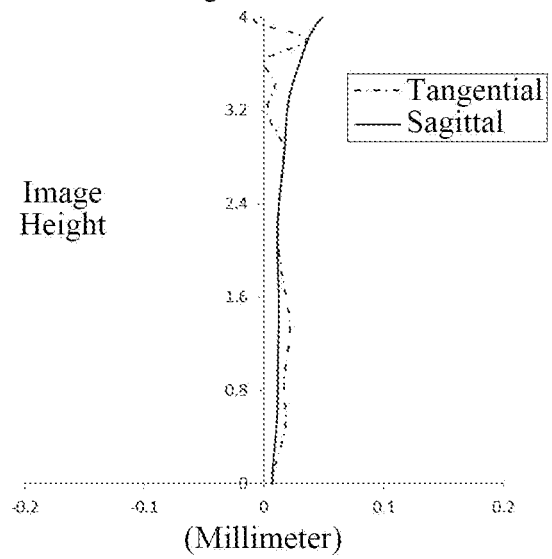
Figure 4C:
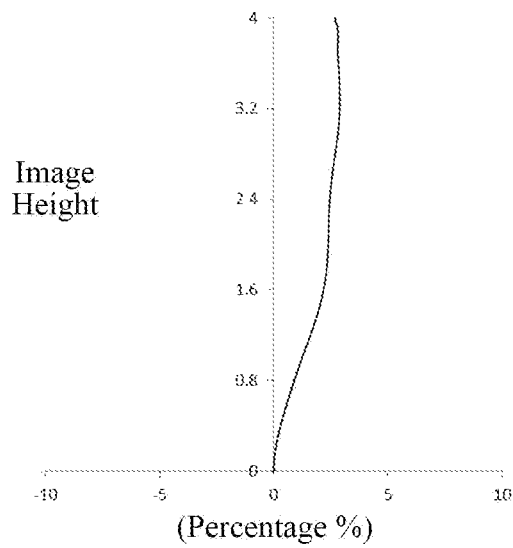
Figure 4D:
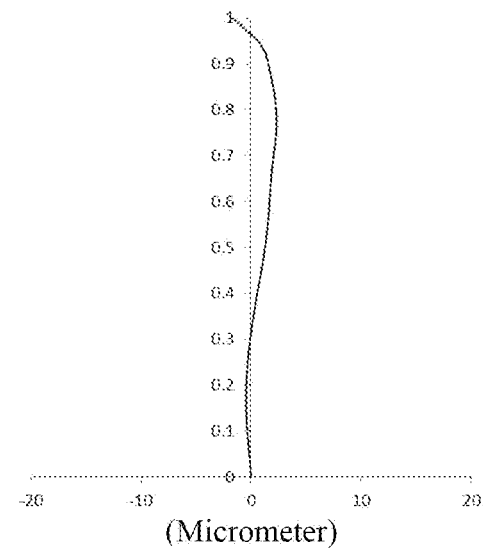

FIG. 4A illustrates the longitudinal aberration curve of the camera lens group according to Embodiment 2, representing deviations of focal points converged by light of different wavelengths after passing through the lens assembly. FIG. 4B illustrates the astigmatic curve of the camera lens group according to Embodiment 2, representing a curvature of a tangential plane and a curvature of a sagittal plane. FIG. 4C illustrates the distortion curve of the camera lens group according to Embodiment 2, representing the amounts of distortion corresponding to different image heights. FIG. 4D illustrates the lateral color curve of the camera lens group according to Embodiment 2, representing deviations of different image heights on an imaging plane after light passes through the lens assembly. It can be seen from FIG. 4A to FIG. 4D that the camera lens group provided in Embodiment 2 can achieve good imaging quality.

Embodiment 3

A camera lens group according to Embodiment 3 of the present disclosure is described below with reference to FIG. 5 to FIG. 6D. FIG. 5 illustrates a schematic structural diagram of the camera lens group according to Embodiment 3 of the present disclosure.

As shown in FIG. 5, the camera lens group from an object side to an image side sequentially includes a diaphragm STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

In this Embodiment, a total effective focal length f of the camera lens group satisfies f=4.76 mm, a total length of the camera lens group TTL satisfies TTL=6.20 mm, half of a diagonal length ImgH of an effective pixel area on the imaging plane S17 of the camera lens group satisfies ImgH=4.00 mm, half of a maximum field-of-view Semi-FOV of the camera lens group satisfies Semi-FOV=39.49°, and an F number Fno of the camera lens group satisfies Fno=1.38.

Table 5 is a table illustrating basic parameters of the camera lens group of Embodiment 3, where the units for the radius of curvature, the thickness/distance and the focal length are millimeter (mm). Tables 6-1 and 6-2 shows high-order coefficients applicable to each aspheric surface according to Embodiment 3, where the surface shape of each aspheric surface may be defined by the formula (1) given in the above Embodiment 1.

TABLE 5

| Surface number | Surface type | Radius of curvature | Thickness Distance | Refractive index | Abbe number | Focal length | Conic coefficient |
|---|---|---|---|---|---|---|---|
| OW  | Sphetical | Infinite  | Infinite |      |       |       |         |
| STO | Spherical | Infinite  | -0.6095  |      |       |       |         |
| S1  | Aspheric  | 2.4602    | 0.9847   | 1.55 | 56.11 | 5.43  | -0.0479 |
| S2  | Aspheric  | -12.4182  | 0.0565   |      |       |       | 6.1769  |
| S3  | Aspheric  | 3.8343    | 0.2550   | 1.68 | 19.25 | 16.08 | 2.4930  |
| S4  | Aspheric  | 2.7601    | 0.5472   |      |       |       | 0.5728  |
| S5  | Aspheric  | 10.4414   | 0.2550   | 1.68 | 19.25 | 48.28 | 4.4423  |
| S6  | Aspheric  | 5.6102    | 0.0488   |      |       |       | -0.9652 |
| S7  | Aspheric  | 10.9591   | 0.5747   | 1.55 | 56.11 | 19.70 | -1.6870 |
| S8  | Aspheric  | -570.1747 | 0.2733   |      |       |       | 99.0000 |
| S9  | Aspheric  | 6.1878    | 0.4540   | 1.57 | 37.31 | -17.19| 2.0101  |
| S10 | Aspheric  | 3.6924    | 0.1893   |      |       |       | -8.6443 |
| S11 | Aspheric  | 1.6691    | 0.4626   | 1.55 | 56.11 | 3.81  | -0.9246 |
| S12 | Aspheric  | 7.6282    | 0.6861   |      |       |       | -3.4968 |
| S13 | Aspheric  | 4.5181    | 0.4450   | 1.55 | 56.11 | -4.28 | -4.4629 |
| S14 | Aspheric  | 1.4869    | 0.3953   |      |       |       | -0.8596 |
| S15 | Spherical | Infinite  | 0.1100   | 1.52 | 64.17 |       |         |
| S16 | Spherical | Infinite  | 0.4623   |      |       |       |         |
| S17 | Spherical | Infinite  | Infinite |      |       |       |         |

TABLE 6-1

| Surface number | A4 | A6 | A8 | A10 | A12 | A14 | A16 |
|---|---|---|---|---|---|---|---|
| S1  | -2.0471E-03 | 5.7390E-03 | -9.8340E-03 | 9.2190E-03  | -5.0839E-03 | 1.5124E-03  | -1.8012E-04 |
| S2  | -1.0167E-01 | 2.1113E-01 | -2.9298E-01 | 2.7945E-01  | -1.8257E-01 | 7.9580E-02  | -2.2066E-02 |
| S3  | -1.4546E-01 | 2.2518E-01 | 2.6441E-01  | 1.9165E-01  | -5.0516E-02 | -4.3929E-02 | 5.1312E-02  |
| S4  | -6.6532E-02 | 2.8268E-02 | 1.2063E-01  | -4.1930E-01 | 6.7939E-01  | -6.5789E-01 | 3.9500E-01  |
| S5  | -6.0433E-02 | 3.4264E-02 | -9.1004E-02 | 1.1137E-01  | -5.6285E-02 | -5.2260E-02 | 1.0353E-01  |
| S6  | -7.2925E-02 | 7.8297E-02 | -2.2205E-01 | 4.2436E-01  | -5.4514E-01 | 4.4676E-01  | -2.2402E-01 |
| S7  | -4.7200E-02 | 7.2515E-02 | -2.2827E-01 | 4.7065E-01  | -6.1908E-01 | 5.1401E-01  | -2.5982E-01 |
| S8  | -4.7389E-02 | 9.9312E-03 | 2.0593E-02  | -6.6959E-02 | 6.8284E-03  | 2.0168E-01  | -3.9062E-01 |
| S9  | -1.1744E-01 | 2.0724E-01 | -4.1435E-01 | 6.9258E-01  | -9.0363E-01 | 8.6637E-01  | -5.9878E-01 |
| S10 | -2.7220E-01 | 3.0606E-01 | -3.2966E-01 | 2.9884E-01  | -2.1596E-01 | 1.1932E-01  | -4.9282E-02 |
| S11 | -1.4702E-01 | 1.2231E-01 | -1.0596E-01 | 6.1174E-02  | -2.4792E-02 | 6.7814E-03  | -1.2409E-03 |

TABLE 6-1-continued

| Surface number | A4 | A6 | A8 | A10 | A12 | A14 | A16 |
|---|---|---|---|---|---|---|---|
| S12 | 4.4107E−02 | −1.2574E−02 | −1.6227E−02 | 1.3459E−02 | −5.3079E−03 | 1.0516E−03 | −3.6627E−06 |
| S13 | −3.0172E−01 | 1.7184E−01 | −7.4359E−02 | 2.3365E−02 | −3.4252E−03 | −4.8657E−04 | 3.5151E−04 |
| S14 | −3.21.48E−01 | 2.2015E−01 | −1.2794E−01 | 5.6647E−02 | −1.8512E−02 | 4.4235E−03 | −7.7011E−04 |

TABLE 6-2

| Surface number | A18 | A20 | A22 | A24 | A26 | A28 | A30 |
|---|---|---|---|---|---|---|---|
| S1 | −1.4091E−05 | 3.9261E−06 | 0.0000E+00 | 0.0000E+00 | 0.0000E+00 | 0.0000E+00 | 0.0000E+00 |
| S2 | 3.5137E−03 | −2.4422E−04 | 0.0000E+00 | 0.0000E+00 | 0.0000E+00 | 0.0000E+00 | 0.0000E+00 |
| S3 | −2.3228E−02 | 5.1959E−03 | −4.7146E−04 | 0.0000E+00 | 0.0000E+00 | 0.0000E+00 | 0.0000E+00 |
| S4 | −1.4289E−01 | 2.8161E−02 | −2.2596E−03 | 0.0000E+00 | 0.0000E+00 | 0.0000E+00 | 0.0000E+00 |
| S5 | −6.9673E−02 | 2.2312E−02 | −2.8393E−03 | 0.0000E+00 | 0.0000E+00 | 0.0000E+00 | 0.0000E+00 |
| S6 | 6.4820E−02 | −9.4645E−03 | 4.7631E−04 | 0.0000E+00 | 0.0000E+00 | 0.0000E+00 | 0.0000E+00 |
| S7 | 7.3636E−02 | −8.8482E−03 | −3.7353E−04 | 1.3870E−04 | 0.0000E+00 | 0.0000E+00 | 0.0000E+00 |
| S8 | 3.8831E−01 | −2.3860E−01 | 9.4025E−02 | −2.3219E−02 | 3.2790E−03 | −2.0232E−04 | 0.0000E+00 |
| S9 | 2.9531E−01 | −1.0234E−01 | 2.4209E−02 | −3.6936E−03 | 3.2160E−04 | −1.1014E−05 | −1.5348E−07 |
| S10 | 1.4843E−02 | −3.1097E−03 | 4.1633E−04 | −2.9063E−05 | 1.0978E−07 | 1.1598E−07 | −4.9943E−09 |
| S11 | 1.5759E−04 | −1.4405E−05 | 8.8942E−07 | −2.7044E−08 | 0.0000E+00 | 0.0000E+00 | 0.0000E+00 |
| S12 | −4.9254E−05 | 1.1866E−05 | −1.3599E−06 | 7.9899E−08 | −1.9352E−09 | 0.0000E+00 | 0.0000E+00 |
| S13 | −8.2044E−05 | 1.1172E−05 | −9.6595E−07 | 5.2487E−08 | −1.6432E−09 | 2.2686E−11 | 0.0000E+00 |
| S14 | 9.7075E−05 | −8.7368E−06 | 5.4612E−07 | −2.2494E−08 | 5.4847E−10 | −5.9936E−12 | 0.0000E+00 |

FIG. 6A illustrates the longitudinal aberration curve of the camera lens group according to Embodiment 3, representing deviations of focal points converged by light of different wavelengths after passing through the lens assembly. FIG. 6B illustrates the astigmatic curve of the camera lens group according to Embodiment 3, representing a curvature of a tangential plane and a curvature of a sagittal plane. FIG. 6C illustrates the distortion curve of the camera lens group according to Embodiment 3, representing the amounts of distortion corresponding to different image heights. FIG. 6D illustrates the lateral color curve of the camera lens group according to Embodiment 3, representing deviations of different image heights on an imaging plane after light passes through the lens assembly. It can be seen from FIG. 6A to FIG. 6D that the camera lens group provided in Embodiment 3 can achieve good imaging quality.

Embodiment 4

A camera lens group according to Embodiment 4 of the present disclosure is described below with reference to FIG. 7 to FIG. 8D. FIG. 7 illustrates a schematic structural diagram of the camera lens group according to Embodiment 4 of the present disclosure.

As shown in FIG. 7, the camera lens group from an object side to an image side sequentially includes a diaphragm STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally forms an image on the imaging plane S17.

In this Embodiment, a total effective focal length f of the camera lens group satisfies f=5.04 mm, a total length of the camera lens group TTL satisfies TTL=6.28 mm, half of a diagonal length ImgH of an effective pixel area on the imaging plane S17 of the camera lens group satisfies ImgH=4.00 mm, half of a maximum field-of-view Semi-FOV of the camera lens group satisfies Semi-FOV=37.59°, and an F number Fno of the camera lens group satisfies Fno=1.38.

Table 7 is a table illustrating basic parameters of the camera lens group of Embodiment 4, where the units for the radius of curvature, the thickness/distance and the focal length are millimeter (mm). Tables 8-1 and 8-2 shows high-order coefficients applicable to each aspheric surface according to Embodiment 4, where the surface shape of each aspheric surface may be defined by the formula (1) given in the above Embodiment 1.

TABLE 7

| Surface number | Surface type | Radius of curvature | Thickness/Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7556 | | | | |
| S1 | Aspheric | 2.3539 | 1.0300 | 1.55 | 56.11 | 5.04 | −0.0060 |
| S2 | Aspheric | 13.7232 | 0.0943 | | | | 15.9075 |
| S3 | Aspheric | 4.3471 | 0.3009 | 1.68 | 19.25 | −10.30 | 2.5944 |
| S4 | Aspheric | 2.6038 | 0.4879 | | | | 0.6207 |
| S5 | Aspheric | 6.2070 | 0.2600 | 1.68 | 19.25 | 79.92 | 7.1648 |
| S6 | Aspheric | 6.8920 | 0.1774 | | | | 8.5101 |
| S7 | Aspheric | 60.1009 | 0.5522 | 1.55 | 56.11 | 21.12 | 99.0000 |
| S8 | Aspheric | −14.2171 | 0.3923 | | | | −10.3138 |
| S9 | Aspheric | 11.1334 | 0.4503 | 1.57 | 37.31 | −11.12 | 7.3789 |
| S10 | Aspheric | 3.9816 | 0.1338 | | | | −7.9675 |
| S11 | Aspheric | 1.7793 | 0.4163 | 1.55 | 56.11 | 4.44 | −0.9049 |
| S12 | Aspheric | 6.1471 | 0.8076 | | | | 4.9427 |
| S13 | Aspheric | −31.5408 | 0.4564 | 1.55 | 56.11 | −3.99 | −6.9941 |
| S14 | Aspheric | 2.3506 | 0.2704 | | | | −7.3276 |
| S15 | Spherical | Infinite | 0.1100 | 1.52 | 64.17 | | |
| S16 | Spherical | Infinite | 0.3374 | | | | |
| S17 | Spherical | Infinite | Infinite | | | | |

TABLE 8-1

| Surface number | A4 | A6 | A8 | A10 | A12 | A14 | A16 |
|---|---|---|---|---|---|---|---|
| S1 | −9.6362E−04 | 2.7828E−03 | −5.9602E−03 | 7.0217E−03 | −5.0892E−03 | 2.2503E−03 | −5.9855E−04 |
| S2 | −8.1826E−02 | 1.3566E−01 | −1.5119E−01 | 1.1714E−01 | −6.2663E−02 | 2.2451E−02 | −5.1270E−03 |
| S3 | −1.4092E−01 | 1.8100E−01 | −1.7310E−01 | 1.1499E−01 | −4.7009E−02 | 7.5965E−03 | 2.6467E−03 |
| S4 | −8.7612E−02 | 6.8294E−02 | 2.5803E−02 | −1.9425E−01 | 3.2209E−01 | −2.9806E−01 | 1.6815E−01 |
| S5 | −5.3610E−02 | 1.4004E−02 | −4.9327E−02 | 8.2640E−02 | −9.6525E−02 | 6.6590E−02 | −2.3925E−02 |
| S6 | −4.5901E−02 | −1.8247E−02 | 7.1164E−02 | −1.7043E−01 | 2.4826E−01 | −2.3716E−01 | 1.4884E−01 |
| S7 | −2.6362E−02 | −2.1276E−02 | 9.2100E−02 | −2.1120E−01 | 3.1920E−01 | −3.2358E−01 | 2.2065E−01 |
| S8 | −4.3655E−02 | −7.8832E−02 | 5.3658E−02 | −1.0341E−01 | 5.6615E−02 | 1.1414E−01 | −2.6788E−01 |
| S9 | −8.8365E−02 | 1.3633E−01 | −3.1154E−01 | 5.7671E−01 | −7.9578E−01 | 7.8071E−01 | −5.4133E−01 |
| S10 | −2.4707E−01 | 2.5861E−01 | −2.4568E−01 | 1.9310E−01 | −1.2458E−01 | 6.3459E−02 | −2.4590E−02 |
| S11 | −1.4445E−01 | 1.1192E−01 | −9.6145E−02 | 5.8955E−02 | −2.5958E−02 | 7.8938E−03 | −1.6491E−03 |
| S12 | 7.3632E−02 | −6.3951E−02 | 2.1175E−02 | 1.0685E−03 | −5.1263E−03 | 2.6677E−03 | −7.4639E−04 |
| S13 | −1.5342E−01 | 6.6774E−02 | 1.3077E−02 | −1.0584E−02 | 1.2175E−02 | −5.8568E−03 | 1.6962E−03 |
| S14 | −1.0503E−01 | 5.9369E−02 | −2.5306E−02 | 6.3359E−03 | −3.3916E−04 | −3.6503E−04 | 1.4990E−04 |

TABLE 8-2

| Surface number | A18 | A20 | A22 | A24 | A26 | A28 | A30 |
|---|---|---|---|---|---|---|---|
| S1 | 8.7173E−05 | −5.5011E−06 | 0.0000E+00 | 0.0000E+00 | 0.0000E+00 | 0.0000E+00 | 0.0000E+00 |
| S2 | 6.7343E−04 | −3.8745E−05 | 0.0000E+00 | 0.0000E+00 | 0.0000E+00 | 0.0000E+00 | 0.0000E+00 |
| S3 | −1.7396E−03 | 3.7735E−04 | −3.0682E−05 | 0.0000E+00 | 0.0000E+00 | 0.0000E+00 | 0.0000E+00 |
| S4 | −5.6683E−02 | 1.0309E−02 | −7.4790E−04 | 0.0000E+00 | 0.0000E+00 | 0.0000E+00 | 0.0000E+00 |
| S5 | 2.4973E−03 | 9.0491E−04 | −2.1580E−04 | 0.0000E+00 | 0.0000E+00 | 0.0000E+00 | 0.0000E+00 |
| S6 | −5.8581E−02 | 1.3056E−02 | −1.2529E−03 | 0.0000E+00 | 0.0000E+00 | 0.0000E+00 | 0.0000E+00 |
| S7 | −9.9113E−02 | 2.7895E−02 | −4.4279E−03 | 3.0096E−04 | 0.0000E+00 | 0.0000E+00 | 0.0000E+00 |
| S8 | 2.7157E−01 | −1.6479E−01 | 6.3403E−02 | −1.5201E−02 | 2.0774E−03 | −1.2375E−04 | 0.0000E+00 |
| S9 | 2.6502E−01 | −9.0717E−02 | 2.1159E−02 | −3.1830E−03 | 2.7347E−04 | −9.2500E−06 | −1.2730E−07 |
| S10 | 7.0032E−03 | −1.3904E−03 | 1.7488E−04 | −1.0767E−05 | −1.6901E−07 | 6.4688E−08 | −2.6717E−09 |

Figure 8A:
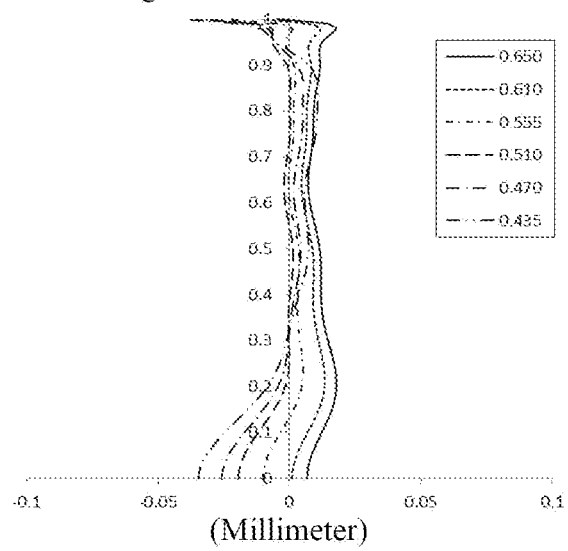
FIGS. 8A-8D respectively illustrate a longitudinal aberration curve, an astigmatic curve, a distortion curve and a lateral color curve of the camera lens group according to Embodiment 4.
Figure 8B:
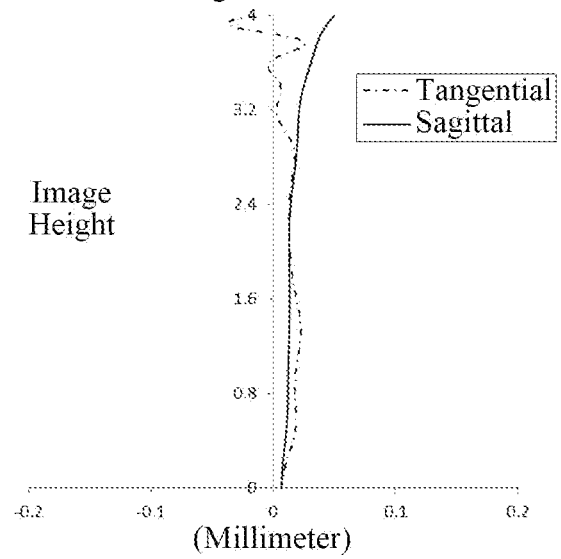
Figure 8C:
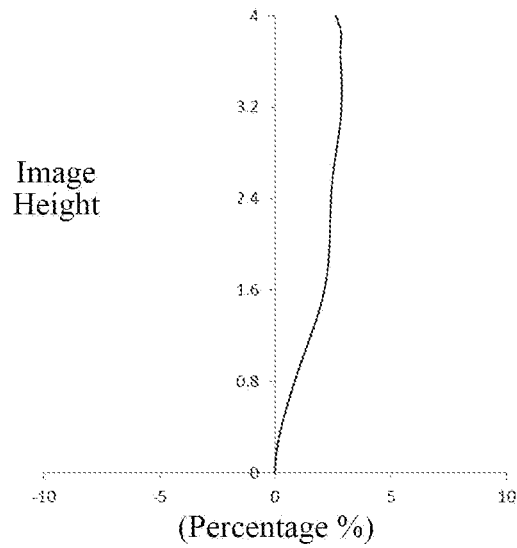
Figure 8D:
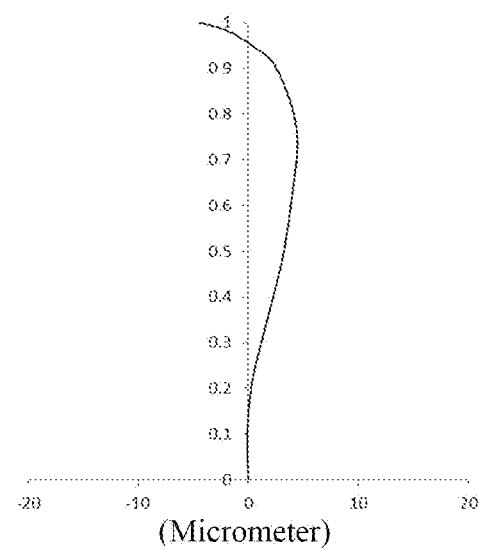

FIG. 8A illustrates the longitudinal aberration curve of the camera lens group according to Embodiment 4, representing deviations of focal points converged by light of different wavelengths after passing through the lens assembly. FIG. 8B illustrates the astigmatic curve of the camera lens group according to Embodiment 4, representing a curvature of a tangential plane and a curvature of a sagittal plane. FIG. 8C illustrates the distortion curve of the camera lens group according to Embodiment 4, representing the amounts of distortion corresponding to different image heights. FIG. 8D illustrates the lateral color curve of the camera lens group according to Embodiment 4, representing deviations of different image heights on an imaging plane after light passes through the lens assembly. It can be seen from FIG. 8A to FIG. 8D that the camera lens group provided in Embodiment 4 can achieve good imaging quality.

Embodiment 5

Figure 9:
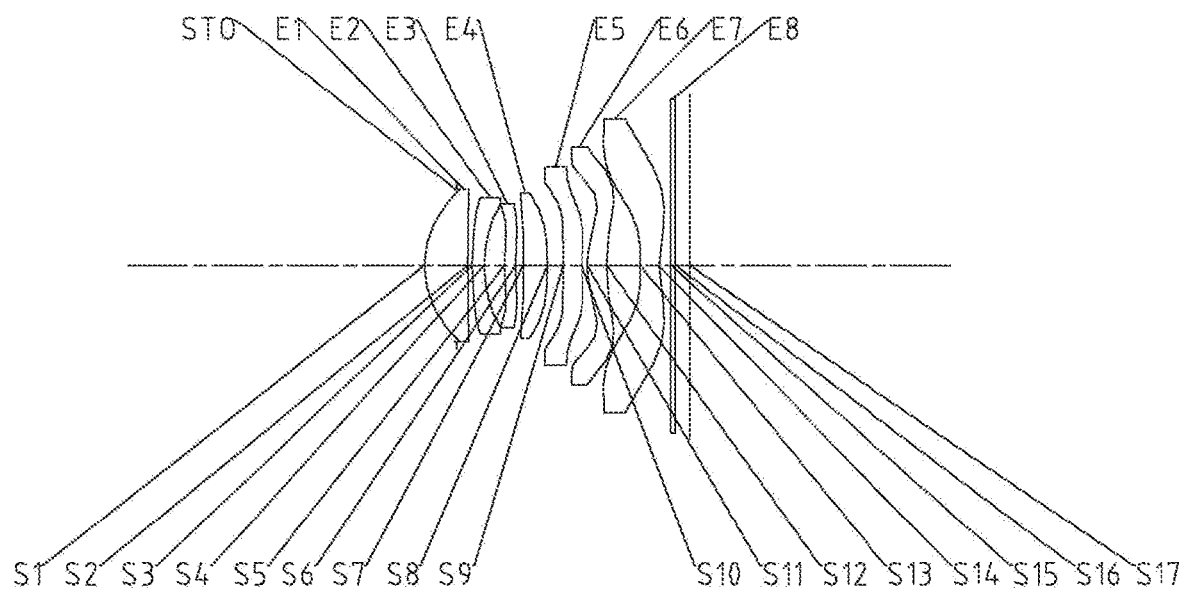
FIG. 9 is a schematic structural diagram illustrating a camera lens group according to Embodiment 5 of the present disclosure.

A camera lens group according to Embodiment 5 of the present disclosure is described below with reference to FIG. 9 to FIG. 10D. FIG. 9 illustrates a schematic structural diagram of the camera lens group according to Embodiment 5 of the present disclosure.

As shown in FIG. 9, the camera lens group from an object side to an image side sequentially includes a diaphragm STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has positive refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and finally forms an image on the imaging plane S17.

In this Embodiment, a total effective focal length f of the camera lens group satisfies f=5.08 mm, a total length of the camera lens group TTL satisfies TTL=6.33 mm, half of a diagonal length ImgH of an effective pixel area on the imaging plane S17 of the camera lens group satisfies ImgH=4.00 mm, half of a maximum field-of-view Semi-FOV of the camera lens group satisfies Semi-FOV=37.64°, and an F number Fno of the camera lens group satisfies Fno=1.39.

Table 9 is a table illustrating basic parameters of the camera lens group of Embodiment 5, where the units for the radius of curvature, the thickness/distance and the focal length are millimeter (mm). Tables 10-1 and 10-2 shows high-order coefficients applicable to each aspheric surface according to Embodiment 5, where the surface shape of each aspheric surface may be defined by the formula (1) given in the above Embodiment 1.

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7606 | | | | |
| S1 | Aspheric | 2.3219 | 1.0275 | 1.55 | 56.11 | 4.98 | 0.0218 |
| S2 | Aspheric | 13.3541 | 0.1015 | | | | 21.2871 |
| S3 | Aspheric | 4.4480 | 0.2942 | 1.68 | 19.25 | −10.12 | 2.6773 |
| S4 | Aspheric | 2.6259 | 0.4861 | | | | 0.6768 |
| S5 | Aspheric | 6.3881 | 0.2611 | 1.68 | 19.25 | 99.90 | −10.4185 |
| S6 | Aspheric | 6.9374 | 0.1859 | | | | −72.0148 |
| S7 | Aspheric | 104.2963 | 0.5666 | 1.55 | 56.11 | 19.65 | 56.6869 |
| S8 | Aspheric | −11.9334 | 0.3811 | | | | −7.1964 |
| S9 | Aspheic | 12.8756 | 0.4522 | 1.57 | 37.31 | −10.82 | 15.0115 |
| S10 | Aspheric | 4.1187 | 0.1313 | | | | −7.4614 |
| S11 | Aspheric | 1.8875 | 0.4612 | 1.55 | 56.11 | 4.58 | −0.9039 |
| S12 | Aspheric | 7.0310 | 0.8053 | | | | −6.6499 |
| S13 | Aspheric | −38.4887 | 0.4500 | 1.55 | 56.11 | −4.27 | 90.9319 |
| S14 | Aspheric | 2.4939 | 0.2728 | | | | −1.0000 |
| S15 | Spherical | Infinite | 0.1100 | 1.52 | 64.17 | | |
| S16 | Spherical | Infinite | 0.3397 | | | | |
| S17 | Spherical | Infinite | Infinite | | | | |

TABLE 10-1

| Surface number | A4 | A6 | A8 | A10 | A12 | A14 | A16 |
|---|---|---|---|---|---|---|---|
| S1 | −7.9928E−04 | 2.4153E−03 | −5.2092E−03 | 6.5157E−03 | −5.0821E−03 | 2.4638E−03 | −7.2894E−04 |
| S2 | −7.7376E−02 | 1.2279E−01 | −1.3150E−01 | 9.9402E−02 | −5.2525E−02 | 1.8751E−02 | −4.2930E−03 |
| S3 | −1.4018E−01 | 1.7400E−01 | −1.5656E−01 | 9.8459E−02 | −3.9129E−02 | 7.0090E−03 | 1.3088E−03 |
| S4 | −9.0771E−02 | 7.1693E−02 | 3.1660E−02 | −2.1545E−01 | 3.6232E−01 | −3.4787E−01 | 2.0740E−01 |
| S5 | −4.4760E−02 | 9.1580E−03 | −3.5666E−02 | 6.9668E−02 | −9.4908E−02 | 7.7815E−02 | −3.7423E−02 |
| S6 | −1.3232E−02 | −3.6831E−02 | 7.4465E−02 | −1.3248E−01 | 1.6754E−01 | −1.4737E−01 | 8.7447E−02 |
| S7 | −2.1532E−02 | −2.0296E−02 | 6.6887E−02 | −1.3372E−01 | 1.9294E−01 | −1.9216E−01 | 1.2965E−01 |
| S8 | −3.8002E−02 | −1.8235E−02 | 6.5330E−02 | −1.1048E−01 | 6.5570E−02 | 8.5412E−02 | −2.1413E−01 |
| S9 | −8.0592E−02 | 1.2891E−01 | −2.9641E−01 | 5.2237E−01 | −6.7522E−01 | 6.2196E−01 | −4.0649E−01 |
| S10 | −2.2993E−01 | 2.4742E−01 | −2.4653E−01 | 1.9795E−01 | 4.2592E−01 | 6.1953E−02 | −2.2863E−02 |
| S11 | −1.4555E−01 | 1.1714E−01 | −1.0124E−01 | 6.2854E−02 | −2.9224E−02 | 1.0076E−02 | −2.5087E−03 |

TABLE 10-1-continued

| Surface number | A4 | A6 | A8 | A10 | A12 | A14 | A16 |
|---|---|---|---|---|---|---|---|
| S12 | 6.2019E−02 | −5.9510E−02 | 3.4163E−02 | 1.8494E−02 | 8.2518E−03 | −2.7481E−03 | 6.5870E−04 |
| S13 | −1.3110E−01 | 4.3734E−02 | −5.0281E−03 | −4.7879E−03 | 4.3017E−03 | 4.8179E−03 | 4.7716E−04 |
| S14 | −1.2590E−01 | 4.0182E−02 | −6.8995E−04 | −8.9491E−03 | 5.7434E−03 | −2.0208E−03 | 4.6604E−04 |

Table 10-2

| Surface number | A18 | A20 | A22 | A24 | A26 | A28 | A30 |
|---|---|---|---|---|---|---|---|
| S1 | 1.2026E−04 | −8.6833E−06 | 0.0000E+00 | 0.0000E+00 | 0.0000E+00 | 0.0000E+00 | 0.0000E+00 |
| S2 | 5.6800E−04 | −3.3085E−05 | 0.0000E+00 | 0.0000E+00 | 0.0000E+00 | 0.0000E+00 | 0.0000E+00 |
| S3 | −1.0204E−03 | 2.1839E−04 | −1.7090E−05 | 0.0000E+00 | 0.0000E+00 | 0.0000E+00 | 0.0000E+00 |
| S4 | −7.5491E−02 | 1.5300E−02 | −1.3114E−03 | 0.0000E+00 | 0.0000E+00 | 0.0000E+00 | 0.0000E+00 |
| S5 | 9.6986E−03 | −9.7511E−04 | −2.2328E−05 | 0.0000E+00 | 0.0000E+00 | 0.0000E+00 | 0.0000E+00 |
| S6 | −3.3135E−02 | 7.2308E−03 | −6.8909E−04 | 0.0000E+00 | 0.0000E+00 | 0.0000E+00 | 0.0000E+00 |
| S7 | −5.7931E−02 | 1.6310E−02 | −2.6001E−03 | 1.7783E−04 | 0.0000E+00 | 0.0000E+00 | 0.0000E+00 |
| S8 | 2.1385E−01 | −1.2650E−01 | 4.7333E−02 | −1.1035E−02 | 1.4671E−03 | −8.5088E−05 | 0.0000E+00 |
| S9 | 1.8827E−01 | −6.1195E−02 | 1.3599E−02 | −1.9550E−03 | 1.6091E−04 | −5.2253E−06 | −6.9036E−08 |
| S10 | 6.1232E−03 | −1.1347E−03 | 1.3325E−04 | −7.7485E−06 | −9.9191E−08 | 4.0104E−08 | −1.6008E−09 |
| S11 | 4.3153E−04 | −4.7850E−05 | 3.0418E−06 | −8.3663E−08 | 0.0000E+00 | 0.0000E+00 | 0.0000E+00 |
| S12 | −1.1173E−04 | 1.3105E−05 | −1.0134E−06 | 4.6520E−08 | −9.5953E−10 | 0.0000E+00 | 0.0000E+00 |
| S13 | −8.4269E−05 | 1.0338E−05 | −8.8626E−07 | 5.2207E−08 | −2.0169E−09 | 4.6055E−11 | −4.7141E−13 |
| S14 | −7.4303E−05 | 8.3364E−06 | −6.5684E−07 | 3.5585E−08 | −1.2623E−09 | 2.6400E−11 | −2.4676E−13 |

Figure 10A:
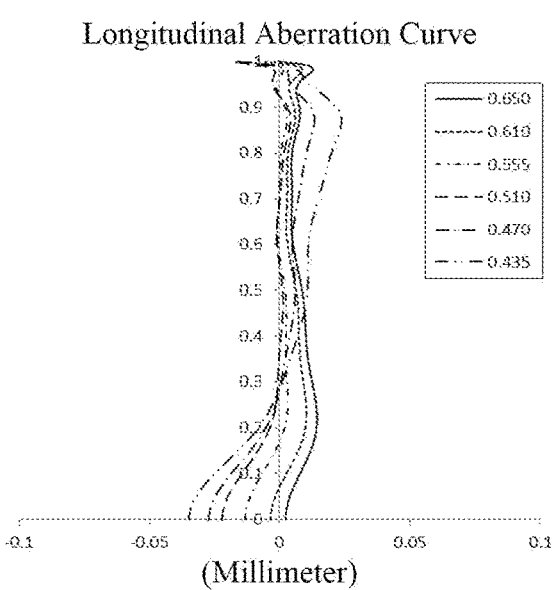
Figure 10B:
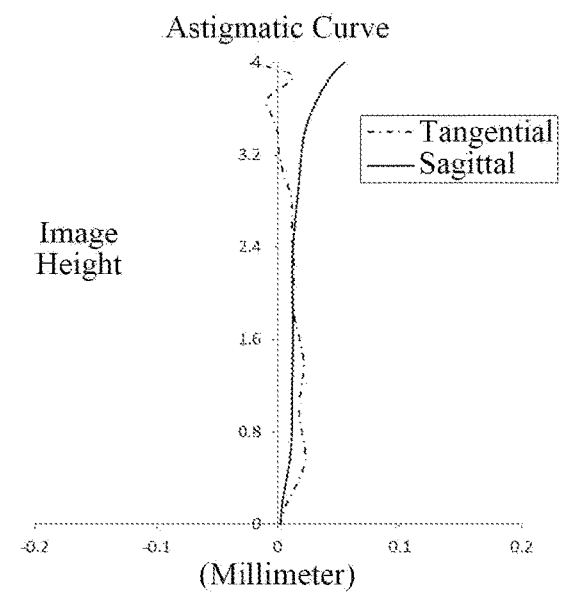

FIG. 10A illustrates the longitudinal aberration curve of the camera lens group according to Embodiment 5, representing deviations of focal points converged by light of different wavelengths after passing through the lens assembly. FIG. 10B illustrates the astigmatic curve of the camera lens group according to Embodiment 5, representing a curvature of a tangential plane and a curvature of a sagittal plane. FIG. 10C illustrates the distortion curve of the camera lens group according to Embodiment 5, representing the amounts of distortion corresponding to different image heights. FIG. 10D illustrates the lateral color curve of the camera lens group according to Embodiment 5, representing deviations of different image heights on an imaging plane after light passes through the lens assembly. It can be seen from FIG. 10A to FIG. 10D that the camera lens group provided in Embodiment 5 can achieve good imaging quality.

Embodiment 6

A camera lens group according to Embodiment 6 of the present disclosure is described below with reference to FIG. 11 to FIG. 12D. FIG. 11 illustrates a schematic structural diagram of the camera lens group according to Embodiment 6 of the present disclosure.

As shown in FIG. 11, the camera lens group from an object side to an image side sequentially includes a diaphragm STO, a first lens E1, a second lens E2, a third lens E3, a fourth lens E4, a fifth lens E5, a sixth lens E6, a seventh lens E7, an optical filter E8 and an imaging plane S17.

The first lens E1 has positive refractive power, an object-side surface S1 of the first lens is a convex surface, and an image-side surface S2 of the first lens is a concave surface. The second lens E2 has negative refractive power, an object-side surface S3 of the second lens is a convex surface, and an image-side surface S4 of the second lens is a concave surface. The third lens E3 has negative refractive power, an object-side surface S5 of the third lens is a convex surface, and an image-side surface S6 of the third lens is a concave surface. The fourth lens E4 has positive refractive power, an object-side surface S7 of the fourth lens is a convex surface, and an image-side surface S8 of the fourth lens is a convex surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a convex surface, and an image-side surface S12 of the sixth lens is a concave surface. The seventh lens E7 has negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and finally forms an image on the imaging plane S17.

In this Embodiment, a total effective focal length f of the camera lens group satisfies f=4.81 mm, a total length of the camera lens group TTL satisfies TTL=6.37 mm, half of a diagonal length ImgH of an effective pixel area on the imaging plane S17 of the camera lens group satisfies ImgH=4.00 mm, half of a maximum field-of-view Semi-FOV of the camera lens group satisfies Semi-FOV=39.00°, and an F number Fno of the camera lens group satisfies Fno=1.39.

Table 11 is a table illustrating basic parameters of the camera lens group of Embodiment 6, where the units for the radius of curvature, the thickness/distance and the focal length are millimeter (mm). Tables 12-1 and 12-2 shows high-order coefficients applicable to each aspheric surface according to Embodiment 6, where the surface shape of each aspheric surface may be defined by the formula (1) given in the above Embodiment 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 40.6589 | | | | |
| S1 | Aspheric | 2.4285 | 0.9067 | 1.55 | 56.11 | 5.45 | −0.0113 |
| S2 | Aspheric | 11.4283 | 0.0684 | | | | 8.7210 |
| S3 | Aspheric | 3.7882 | 0.3168 | 1.68 | 19.25 | 47.35 | 2.4179 |
| S4 | Asphenc | 2.7682 | 0.5688 | | | | 0.7892 |
| S5 | Aspheric | 9.5452 | 0.2600 | 1.68 | 19.25 | 48.59 | 10.6800 |
| S6 | Aspheric | 5.3702 | 0.0494 | | | | 40.9418 |
| S7 | Aspheric | 9.5426 | 0.5472 | 1.55 | 56. 11 | 17.13 | −14.9498 |
| S8 | Aspheric | −458.1428 | 0.3069 | | | | −99.0000 |
| S9 | Aspheric | 8.1336 | 0.4675 | 1.57 | 37.31 | 47.29 | 5.0019 |
| S10 | Aspheric | 4.3641 | 0.2119 | | | | −8.2361 |
| S11 | Aspheric | 1.8657 | 0.7198 | 1.55 | 56.11 | 3.94 | −0.9630 |
| S12 | Aspheric | 12.1313 | 0.4872 | | | | −24.5244 |
| S13 | Aspheric | −10.0000 | 0.6755 | 1.55 | 56.11 | −4.40 | −99.0000 |
| S14 | Aspheric | 3.2368 | 0.3034 | | | | −0.7729 |
| S15 | Spherical | Infinite | 0.1100 | 1.52 | 64.17 | | |
| S16 | Spherical | Infinite | 0.3703 | | | | |
| S17 | Spherical | Infinite | Infinite | | | | |

TABLE 12-1

| Surface number | A4 | A6 | A8 | A10 | A12 | A14 | A16 |
|---|---|---|---|---|---|---|---|
| S1 | 1.8603E−04 | −5.5983E−04 | 2.1275E−03 | −4.1667E−03 | 4.1820E−03 | −2.4521E−03 | 8.3062E−04 |
| S2 | −8.4471E−02 | 1.3791E−01 | −1.5213E−01 | 1.1696E−01 | −6.2192E−02 | 2.2128E−02 | −4.9973E−03 |
| S3 | −1.1783E−01 | 1.3634E−01 | −1.0911E−01 | 3.5552E−02 | 2.9498E−02 | −4.5200E−02 | 2.7262E−02 |
| S4 | −5.5806E−02 | 1.9265E−02 | 7.1478E−02 | −2.1476E−01 | 3.1367E−01 | −2.8079E−01 | 1.5859E−01 |
| S5 | −5.7842E−02 | 2.6968E−02 | −7.9976E−02 | 1.2187E−01 | −1.0955E−01 | 3.2444E−02 | 2.8909E−02 |
| S6 | −7.9825E−02 | 1.3094E−01 | −3.8015E−01 | 7.1283E−01 | −8.8337E−01 | 7.1323E−01 | −3.6678E−01 |
| S7 | −6.2064E−02 | 1.3912E−01 | −3.7121E−01 | 6.4467E−01 | −7.3640E−01 | 5.5083E−01 | −2.5990E−01 |
| S8 | −6.4962E−02 | 8.5470E−02 | −1.6465E−01 | 2.5302E−01 | −3.6637E−01 | 4.7519E−01 | −4.8838E−01 |
| S9 | −1.2684E−01 | 2.2595E−01 | −4.0142E−01 | 6.1541E−01 | −7.6378E−01 | 7.0768E−01 | −4.7503E−01 |
| S10 | −2.5393E−01 | 2.2788E−01 | −1.5694E−01 | 9.0886E−02 | −5.6335E−02 | 3.5805E−02 | −1.8934E−02 |
| S11 | −1.3219E−01 | 7.2940E−03 | 5.2268E−02 | −6.7029E−02 | 5.0106E−02 | −2.5713E−02 | 8.8825E−03 |
| S12 | 1.0084E−01 | −1.8852E−01 | 1.5616E−01 | −9.2337E−02 | 4.3964E−02 | −1.7432E−02 | 5.4189E−03 |
| S13 | −8.3464E−03 | −1.0782E−01 | 5.4799E−02 | 9.1992E−03 | −2.0152E−02 | 9.8649E−03 | −2.7161E−03 |
| S14 | 2.9399E−04 | −7.8392E−02 | 5.9945E−02 | −2.5479E−02 | 7.1101E−03 | −1.3693E−03 | 1.8576E−04 |

TABLE 12-2

| Surface number | A18 | A20 | A22 | A24 | A26 | A28 | A30 |
|---|---|---|---|---|---|---|---|
| S1 | −1.5226E−04 | 1.1466E−05 | 0.0000E+00 | 0.0000E+00 | 0.0000E+00 | 0.0000E+00 | 0.0000E+00 |
| S2 | 6.4355E−04 | −3.5794E−05 | 0.0000E+00 | 0.0000E+00 | 0.0000E+00 | 0.0000E+00 | 0.0000E+00 |
| S3 | −9.0094E−03 | 1.5951E−03 | −1.1797E−04 | 0.0000E+00 | 0.0000E+00 | 0.0000E+00 | 0.0000E+00 |
| S4 | −5.4594E−02 | 1.0300E−02 | −7.8942E−04 | 0.0000E+00 | 0.0000E+00 | 0.0000E+00 | 0.0000E+00 |
| S5 | −3.1209E−02 | 1.1421E−02 | −1.5299E−03 | 0.0000E+00 | 0.0000E+00 | 0.0000E+00 | 0.0000E+00 |
| S6 | 1.1495E−01 | −1.9850E−02 | 1.4346E−03 | 0.0000E+00 | 0.0000E+00 | 0.0000E+00 | 0.0000E+00 |
| S7 | 7.1374E−02 | −9.0913E−03 | −4.9329E−05 | 9.0797E−05 | 0.0000E+00 | 0.0000E+00 | 0.0000E+00 |
| S8 | 3.6874E−01 | 4.9635E−01 | 7.1182E−02 | −1.6661E−02 | 2.2662E−03 | −1.3591E−04 | 0.0000E+00 |
| S9 | 2.2775E−01 | −7.6681E−02 | 1.7607E−02 | −2.6061E−03 | 2.2018E−04 | −7.3245E−06 | −9.9132E−08 |
| S10 | 7.2094E−03 | −1.8123E−03 | 2.7639E−04 | −2.1233E−05 | 1.4250E−07 | 8.3238E−08 | −3.5004E−09 |
| S11 | −1.9916E−03 | 2.7637E−04 | −2.1521E−05 | 7.1812E−07 | 0.0000E+00 | 0.0000E+00 | 0.0000E+00 |
| S12 | −1.2306E−03 | 1.9357E−04 | −1.9866E−05 | 1.1934E−06 | −3.1758E−08 | 0.0000E+00 | 0.0000E+00 |
| S13 | 4.8129E−04 | −5.7031E−05 | 4.5084E−06 | −2.2875E−07 | 6.7486E−09 | −8.8097E−11 | 0.0000E+00 |
| S14 | −1.7868E−05 | 1.2110E−06 | −5.6541E−08 | 1.7312E−09 | −3.1313E−11 | 2.5390E−13 | 0.0000E+00 |

Figure 12A:
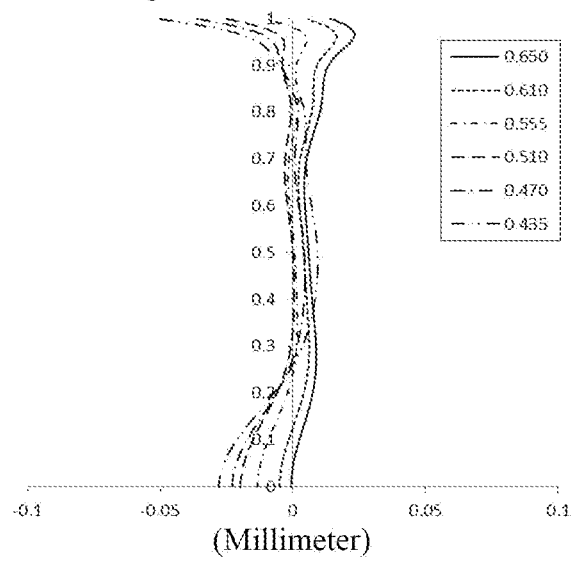
FIGS. 12A-12D respectively illustrate a longitudinal aberration curve, an astigmatic curve, a distortion curve and a lateral color curve of the camera lens group according to Embodiment 6.
Figure 12B:
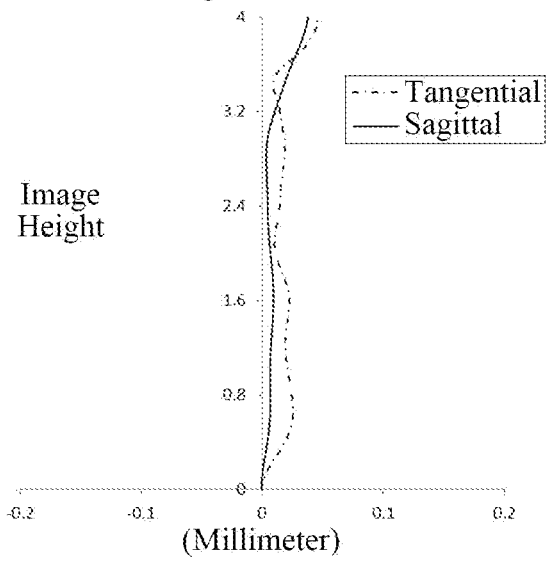
Figure 12C:
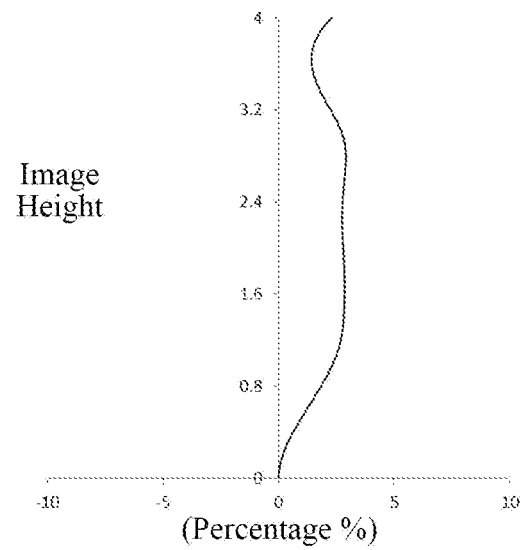
Figure 12D:
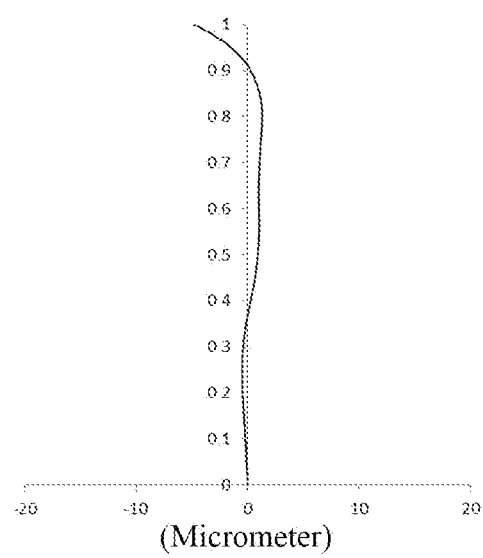

FIG. 12A illustrates the longitudinal aberration curve of the camera lens group according to Embodiment 6, representing deviations of focal points converged by light of different wavelengths after passing through the lens assembly. FIG. 12B illustrates the astigmatic curve of the camera lens group according to Embodiment 6, representing a curvature of a tangential plane and a curvature of a sagittal plane. FIG. 12C illustrates the distortion curve of the camera lens group according to Embodiment 6, representing the amounts of distortion corresponding to different image heights. FIG. 12D illustrates the lateral color curve of the camera lens group according to Embodiment 6, representing deviations of different image heights on an imaging plane after light passes through the lens assembly. It can be seen from FIG. 12A to FIG. 12D that the camera lens group provided in Embodiment 6 can achieve good imaging quality.

In view of the above, Embodiments 1 to 6 respectively satisfy the relationship shown in Table 13.

TABLE 13

| Conditional/<br>Embodiment | 1 | 2 | 3 | 4 | 5 | 6 |
|---|---|---|---|---|---|---|
| TTL/ImgH | 1.48 | 1.57 | 1.55 | 1.57 | 1.58 | 1.59 |
| f1/f | 1.14 | 1.00 | 1.14 | 1.00 | 0.98 | 1.13 |
| R7/R8 | −0.02 | −2.34 | −0.0 | −4.23 | −8.74 | −0.02 |
| R10/R9 | 0.60 | 0.38 | 0.60 | 0.36 | 0.32 | 0.54 |
| T34/T12 | 0.86 | 1.81 | 0.86 | 1.88 | 1.83 | 0.72 |
| |f6/R12| | 0.50 | 0.74 | 0.50 | 0.72 | 0.65 | 0.32 |
| ET7/CT7 | 1.29 | 1.31 | 1.64 | 1.53 | 1.12 | 1.74 |
| SAG32/SAG31 | 0.29 | 0.42 | 0.25 | 0.43 | 0.41 | 0.30 |
| DT31/DT11 | 0.81 | 0.79 | 0.8:3 | 0.81 | 0.79 | 0.82 |
| CT1/(CT2 + CT3) | 1.93 | 1.85 | 1.93 | 1.84 | 1.85 | 1.57 |

Embodiments of the present disclosure further provide an imaging apparatus, having an electronic photosensitive element, which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the camera lens group described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in embodiments of the present disclosure with (but not limited to), technical features with similar functions.

What is claimed is:

1. A camera lens group, along an optical axis from an object side to an image side, sequentially comprising:
   a first lens having positive refractive power;
   a second lens having negative refractive power;
   a third lens having positive refractive power or negative refractive power;
   a fourth lens having positive refractive power, an object-side surface of the fourth lens being a convex surface, and an image-side surface of the fourth lens being a convex surface;
   a fifth lens having negative refractive power, an object-side surface of the fifth lens being a convex surface, and an image-side surface of the fifth lens being a concave surface;
   a sixth lens having positive refractive power, and an image-side surface of the sixth lens being a concave surface; and
   a seventh lens having negative refractive power, wherein, a total effective focal length f of the camera lens group and an entrance pupil diameter EPD of the camera lens group satisfy: f/EPD<1.45.

2. The camera lens group according to claim 1, wherein the total effective focal length f of the camera lens group and an effective focal length f1 of the first lens satisfy: 0.5<f1/f<1.5.

3. The camera lens group according to claim 1, wherein a maximum effective radius DT11 of an object-side surface of the first lens and a maximum effective radius DT31 of an object-side surface of the third lens satisfy: 0.6<DT31/DT11<1.

4. The camera lens group according to claim 1, wherein a spacing distance T12 between the first lens and the second lens on the optical axis and a spacing distance T34 between the third lens and the fourth lens on the optical axis satisfy: 0.6<T34/T12<2.

5. The camera lens group according to claim 1, wherein a center thickness CT1 of the first lens on the optical axis, a center thickness CT2 of the second lens on the optical axis, and a center thickness CT3 of the third lens on the optical axis satisfy: 1.3<CT1/(CT2+CT3)<2.1.

6. The camera lens group according to claim 1, wherein a radius of curvature R7 of the object-side surface of the fourth lens and a radius of curvature R8 of the image-side surface of the fourth lens satisfy: −9<R7/R8<0.

7. The camera lens group according to claim 1, wherein a radius of curvature R9 of the object-side surface of the fifth lens and a radius of curvature R10 of the image-side surface of the fifth lens satisfy: 0.2<R10/R9<0.8.

8. The camera lens group according to claim 1, wherein an effective focal length f6 of the sixth lens and a radius of curvature R12 of the image-side surface of the sixth lens satisfy: 0.2<|f6/R12|<0.9.

9. The camera lens group according to claim 1, wherein a center thickness CT7 of the seventh lens on the optical axis and an edge thickness ET7 of the seventh lens satisfy: 1<ET7/CT7<1.8.

10. The camera lens group according to claim 1, wherein an axial distance SAG31 from an intersection of an object-side surface of the third lens and the optical axis to a vertex of an effective radius of the object-side surface of the third lens, and an axial distance SAG32 from an intersection of an image-side surface of the third lens and the optical axis to a vertex of an effective radius of the image-side surface of the third lens, satisfy: 0.1<SAG32/SAG31<0.5.

11. The camera lens group according to claim 1, wherein a distance TTL from the object-side surface of the first lens to an imaging plane of the camera lens group on the optical axis and half of a diagonal length ImgH of an effective pixel area on the imaging plane of the camera lens group satisfy: TTL/ImgH≤1.59.

12. A camera lens group, along an optical axis from an object side to an image side, sequentially comprising:
   a first lens having positive refractive power;
   a second lens having negative refractive power;
   a third lens having positive refractive power or negative refractive power;
   a fourth lens having positive refractive power, an object-side surface of the fourth lens being a convex surface, and an image-side surface of the fourth lens being a convex surface;
   a fifth lens having negative refractive power, an object-side surface of the fifth lens being a convex surface, and an image-side surface of the fifth lens being a concave surface;

a sixth lens having positive refractive power, and an image-side surface of the sixth lens being a concave surface; and a seventh lens having negative refractive power, wherein, an effective focal length f6 of the sixth lens and a radius of curvature R12 of the image-side surface of the sixth lens satisfy: $0.2 < |f6/R12| < 0.9$.

13. The camera lens group according to claim 12, wherein a total effective focal length f of the camera lens group and an effective focal length f1 of the first lens satisfy: $0.5 < f1/f < 1.5$.

14. The camera lens group according to claim 12, wherein a maximum effective radius DT11 of an object-side surface of the first lens and a maximum effective radius DT31 of an object-side surface of the third lens satisfy: $0.6 < DT31/DT11 < 1$.

15. The camera lens group according to claim 12, wherein a spacing distance T12 between the first lens and the second lens on the optical axis and a spacing distance T34 between the third lens and the fourth lens on the optical axis satisfy: $0.6 < T34/T12 < 2$.

16. The camera lens group according to claim 12, wherein a center thickness CT1 of the first lens on the optical axis, a center thickness CT2 of the second lens on the optical axis, and a center thickness CT3 of the third lens on the optical axis satisfy: $1.3 < CT1/(CT2+CT3) < 2.1$.

17. The camera lens group according to claim 12, wherein a radius of curvature R7 of the object-side surface of the fourth lens and a radius of curvature R8 of the image-side surface of the fourth lens satisfy: $-9 < R7/R8 < 0$; or a radius of curvature R9 of the object-side surface of the fifth lens and a radius of curvature R10 of the image-side surface of the fifth lens satisfy: $0.2 < R10/R9 < 0.8$.

18. The camera lens group according to claim 12, wherein a center thickness CT7 of the seventh lens on the optical axis and an edge thickness ET7 of the seventh lens satisfy: $1 < ET7/CT7 < 1.8$.

19. The camera lens group according to claim 12, wherein an axial distance SAG31 from an intersection of an object-side surface of the third lens and the optical axis to a vertex of an effective radius of the object-side surface of the third lens, and an axial distance SAG32 from an intersection of an image-side surface of the third lens and the optical axis to a vertex of an effective radius of the image-side surface of the third lens, satisfy: $0.1 < SAG32/SAG31 < 0.5$.

20. The camera lens group according to claim 12, wherein a distance TTL from the object-side surface of the first lens to an imaging plane of the camera lens group on the optical axis and half of a diagonal length ImgH of an effective pixel area on the imaging plane of the camera lens group satisfy: $TTL/ImgH \leq 1.59$.

* * * * *